(12) United States Patent
Yarvis et al.

(10) Patent No.: US 12,015,499 B2
(45) Date of Patent: Jun. 18, 2024

(54) ADAPTIVE DEPLOYMENT OF APPLICATIONS

(71) Applicant: Intel Corporation, Santa Clara, CA (US)

(72) Inventors: Mark Yarvis, Portland, OR (US); Aaron R. Berck, Hillsboro, OR (US); Sharad K. Garg, Portland, OR (US); Casey Rathbone, Banks, OR (US); Andrew G. Shirtz, Mountain View, CA (US); Ron Kuruvilla Thomas, San Jose, CA (US); Xubo Zhang, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 22 days.

(21) Appl. No.: 17/702,264

(22) Filed: Mar. 23, 2022

(65) Prior Publication Data

US 2022/0271968 A1    Aug. 25, 2022

Related U.S. Application Data

(63) Continuation of application No. 16/478,591, filed as application No. PCT/US2017/039436 on Jun. 27, 2017, now Pat. No. 11,296,902.

(60) Provisional application No. 62/454,887, filed on Feb. 5, 2017.

(51) Int. Cl.
*H04L 12/28*    (2006.01)
*H04L 67/00*    (2022.01)
*H04L 67/125*   (2022.01)
*H04L 67/60*    (2022.01)

(52) U.S. Cl.
CPC ........ *H04L 12/2814* (2013.01); *H04L 12/281* (2013.01); *H04L 67/125* (2013.01); *H04L 67/34* (2013.01); *H04L 67/60* (2022.05)

(58) Field of Classification Search
CPC ........ H04L 67/34; H04L 67/60; H04L 67/125
See application file for complete search history.

(56) References Cited

U.S. PATENT DOCUMENTS

| | | | |
|---|---|---|---|
| 2014/0379924 A1* | 12/2014 | Das | H04L 47/72 709/226 |
| 2015/0378716 A1* | 12/2015 | Singh | H04L 67/10 717/172 |
| 2016/0078342 A1* | 3/2016 | Tang | H04L 41/00 706/47 |
| 2016/0323373 A1* | 11/2016 | Bryant | H04L 67/1014 |
| 2017/0075709 A1* | 3/2017 | Feng | G06F 9/4887 |
| 2018/0375720 A1* | 12/2018 | Yang | H04L 65/40 |

OTHER PUBLICATIONS

U.S. Appl. No. 16/478,591 U.S. Pat. No. 11,296,902, filed Jul. 17, 2019, Adaptive Deployment of Applications.

* cited by examiner

*Primary Examiner* — Clayton R Williams
(74) *Attorney, Agent, or Firm* — Schwegman Lundberg & Woessner

(57) ABSTRACT

An Internet of Things (IoT) system that includes an orchestration device is provided. The orchestration device receives resource requirements and accesses a device/capability map to produce a task deployment map.

21 Claims, 24 Drawing Sheets

300

400

500

500

500

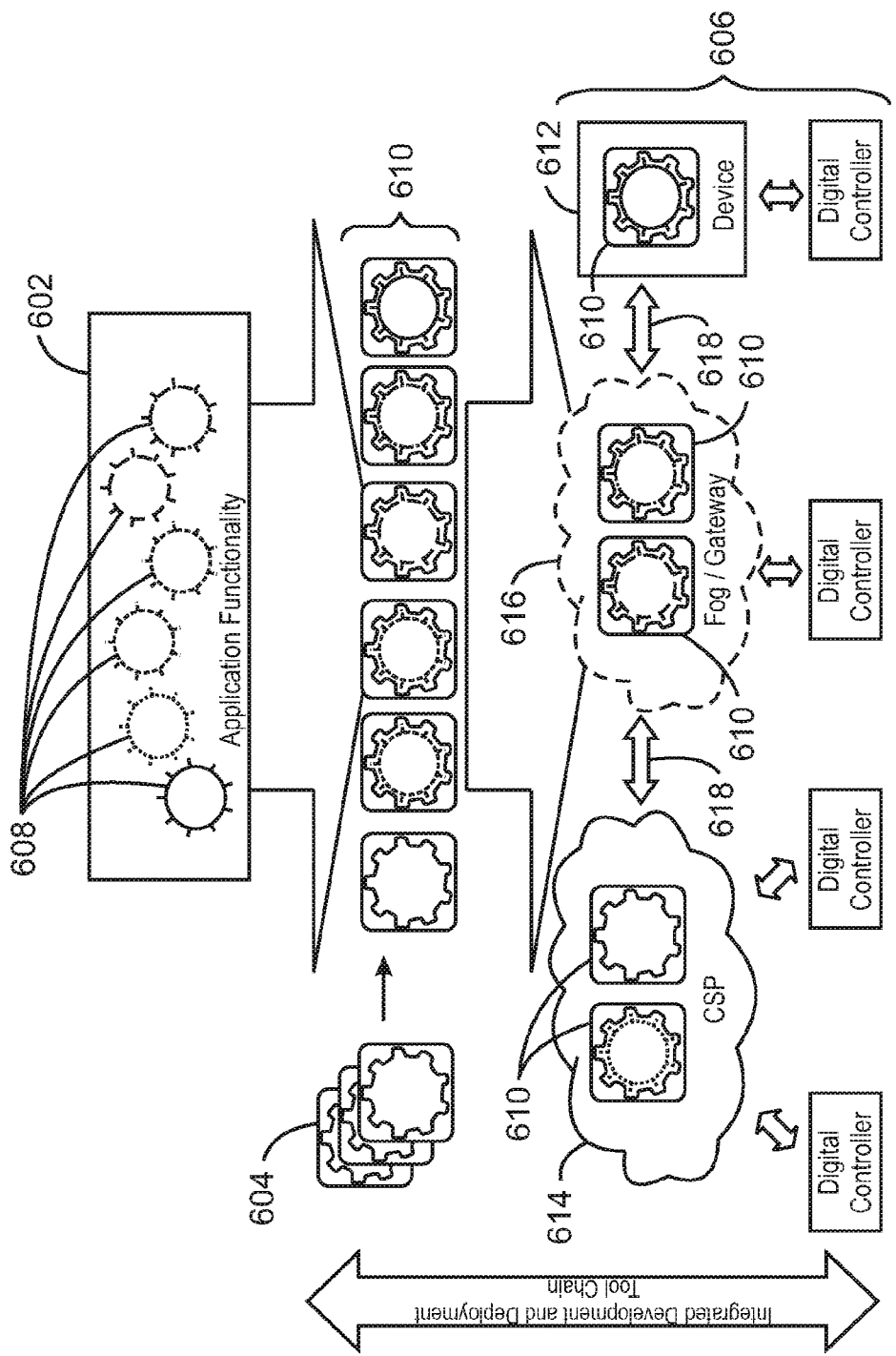

800

900

1000

ADAPTIVE DEPLOYMENT OF APPLICATIONS

CROSS REFERENCE TO RELATED APPLICATION

The present application claims the benefit of the filing date of U.S. Patent Provisional Application Ser. No. 62/454,887, by Yarvis et al., entitled "ADAPTIVE DEPLOYMENT OF APPLICATIONS," filed Feb. 5, 2017, and which is incorporated herein by reference.

TECHNICAL FIELD

The present techniques relate generally to the Internet of Things (IoT). More specifically the present techniques relate to the deployment of applications in an IoT environment.

BACKGROUND

A current view of the Internet is the connection of clients, such as personal computers, tablets, smart phones, servers, digital photo-frames, and many other types of devices, to publicly-accessible data-centers hosted in server farms. However, this view represents a small portion of the overall usage of the globally-connected network. A very large number of connected resources currently exist, but are not publicly accessible. Examples include corporate networks, private organizational control networks, and monitoring networks spanning the globe, often using peer-to-peer relays for anonymity.

It has been estimated that the internet of things (IoT) may bring Internet connectivity to more than 15 billion devices by 2020. For organizations, IoT devices may provide opportunities for monitoring, tracking, or controlling other devices and items, including further IoT devices, other home and industrial devices, items in manufacturing and food production chains, and the like. The emergence of IoT networks has served as a catalyst for profound change in the evolution of the Internet. In the future, the Internet is likely to evolve from a primarily human-oriented utility to an infrastructure where humans may eventually be minority actors in an interconnected world of devices.

In this view, the Internet will become a communications system for devices, and networks of devices, to not only communicate with data centers, but with each other. The devices may form functional networks, or virtual devices, to perform functions, which may dissolve once the function is performed. Challenges exist in enabling reliable, secure, and identifiable devices that can form networks as needed to accomplish tasks.

The initial rollout of IoT devices and networks into home, industrial, automotive, and other usages, has been highly verticalized. For example, individual vendors typically provide end-to-end solutions that involve highly integrated and, in many cases, fixed-function devices and groups of devices. Fixed-function devices may be constrained in computing power, memory, or other resources, limiting the adaptability of the IoT networks. New functional models for coordinating the use of dynamic and distributed resources may make IoT networks more adaptable.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 6 is a schematic diagram of an example of an application being packaged into containers, which are then provisioned to systems in accordance with some embodiments.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Mechanisms and infrastructure described herein allow applications to be developed and dynamically deployed across IoT devices, creating a software definable IoT infrastructure that adapts to the changing environment and is software re-definable to meet the needs of the users or business. In the IoT infrastructure, IoT applications may be composed of a set of functional blocks that are dynamically deployed onto physical resources to meet a given user or business goal. The code modules that make up functional blocks are built to be deployable across the compute stack, for example, into IoT nodes, compute nodes, gateways, local fog devices, and the cloud, among others. Deployment may be in the form of containers, code in virtual machines, or firmware programmed directly onto hardware. Where and how each component is deployed may be dynamically controlled by an orchestration mechanism.

The IoT environment described may separate business processes from implementation and allow for the rapid deployment of new functionality. Further, the techniques may allow the dynamic configuration of applications, depending on available resources. For example, the techniques may be used in an oil refinery. In this example, the sensors and actuators have been deployed in a configuration that produces a certain ratio of automotive fuel and jet fuel. As the availability of raw materials, commodity pricing, and demand changes, the refining infrastructure may be quickly reconfigured to change the ratio of products produced, by reprogramming and reconfiguring software in devices.

Figure 1:
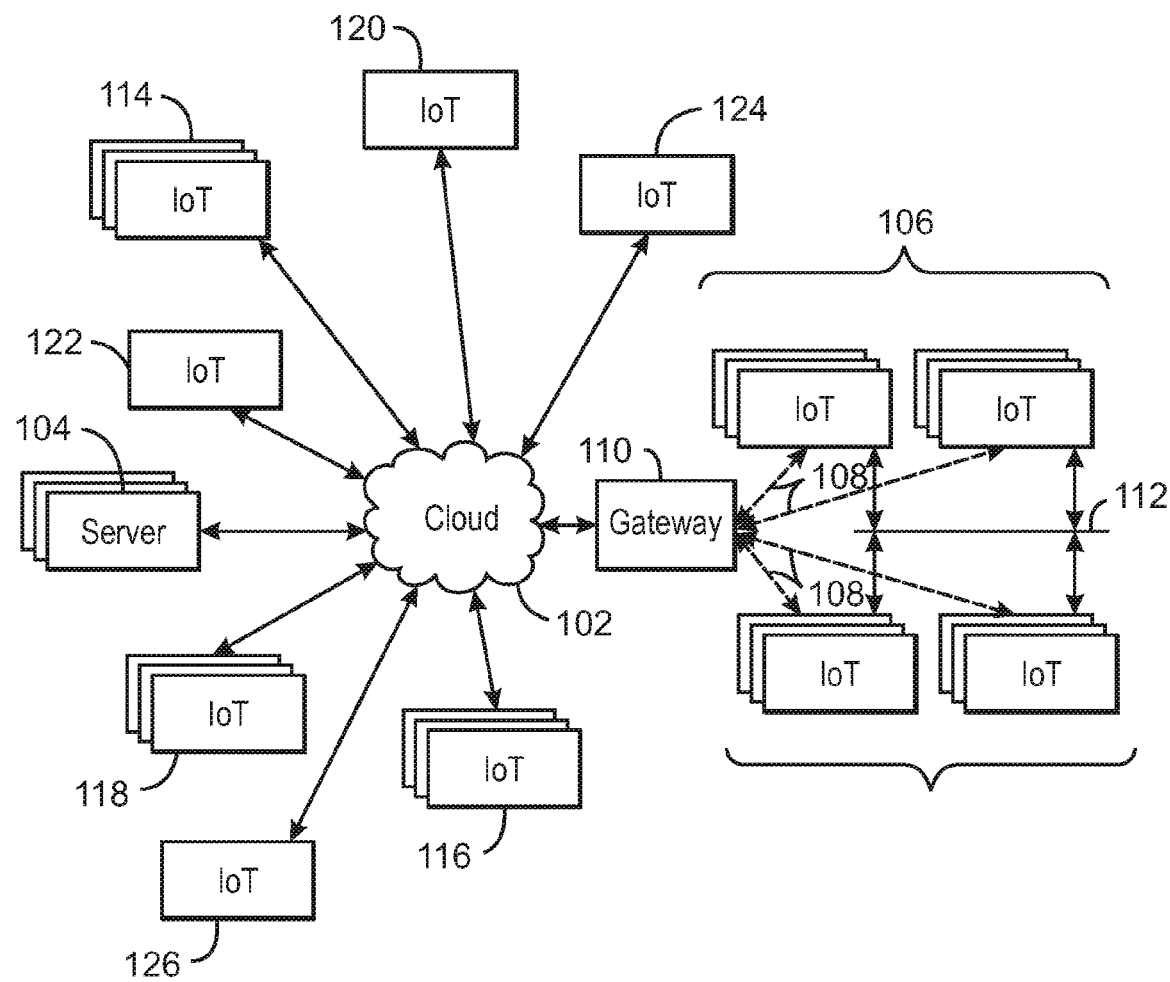
FIG. 1 is a drawing of a cloud computing network, or cloud, in communication with a number of Internet of Things (IoT) devices in accordance with some embodiments.

FIG. 1 is a drawing of a cloud computing network, or cloud 102, in communication with a number of Internet of Things (IoT) devices in accordance with some embodiments. The cloud 102 may represent the Internet, or may be a local area network (LAN), or a wide area network (WAN), such as a proprietary network for a company, or intranet. The IoT devices may include any number of different types of devices, grouped in various combinations. Further, as used herein, the IoT devices may include any number of other types of devices such as a personal computer, a tablet, a smart phone, a smart television, and the like. For example, a traffic control group 106 may include IoT devices along streets in a city. These IoT devices may include stoplights, traffic flow monitors, cameras, weather sensors, and the like. The traffic control group 106, or other subgroups, may be in communication with the cloud 102 through links 108, such as low-power wide area (LPWA) links, and the like. Further, a wired or wireless sub-network 112 may allow the IoT devices to communicate with each other, such as through a local area network, a wireless local area network, and the like. The IoT devices may use another device, such as a gateway 110 to communicate with the cloud 102. In some examples, the sub-network 112 may couple one or more of the IoT devices to the gateway 110 using a wired network.

Moreover, any of the IoT devices may also use one or more servers (not shown) operationally disposed along the gateway 110, or between the group 106 and the gateway 110, to facilitate communication of the group 106 with the cloud 102 or with the gateway 110. For example, the one or more servers may operate as an intermediate network node to support a local edge cloud or fog implementation among a local area network.

The network topology may include various types of IoT networks, such as a mesh network via Bluetooth® low energy (BLE) links. Other types of IoT networks may include a wireless local area network (WLAN) network to communicate with IoT devices through IEEE 802.11 (Wi-Fi®) links, a cellular network to communicate with IoT devices through an LTE/LTE-A (4G) or 5G cellular network, and a LPWA network. A LPWA network may be compatible with the long range wide area network (LoRaWAN™) specification promulgated by the LoRa alliance. The network topology or IoT network(s) may include IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) via a variety of communications links, such as an LTE cellular link, an LPWA link, or a link based on the IEEE 802.15.4 standard, such as Zigbee®, and so on. The respective IoT networks may also operate by network and internet application protocols such as Constrained Application Protocol (CoAP). The respective IoT networks may also be integrated with coordinator devices that provide a chain of links that forms cluster tree of linked devices and networks.

Although wireless networks and wired networks are described, such as LPWA links, optical links, and the like, it may be noted that any type of network may be used to couple the devices to each other or to a gateway 110. A network or assembled group of devices may have both wired and wireless connections, and may use both simultaneously between nodes, peers, and gateway devices. Further the network or assembled group of devices may use wired networks, wireless networks, or both, to communicate with the cloud, and any higher performance computing devices that may be participating to deliver services or support to what is disclosed herein. Thus, any link 108 or network 112 may utilize a wired connection or a wireless connection. Further, IoT devices may be in direct communications with other devices in the cloud 102 without the use of a gateway 110. Additionally, the links 108 may use optical signal paths among both IoT devices with the cloud 102 and the gateway (s) 110, including the use of MUXing/deMUXing components that facilitate interconnection of the various devices.

IoT devices may include remote weather stations 114, local information terminals 116, alarm systems 118, automated teller machines 120, alarm panels 122, or moving vehicles, such as emergency vehicles 124 or other vehicles 126, among many others. Each of these IoT devices may be in communication with other IoT devices, with servers 104, or both.

As can be seen from FIG. 1, a large number of IoT devices may be communicating through the cloud 102. This may allow different IoT devices to request or provide information to other devices autonomously. For example, the traffic control group 106 may request a current weather forecast from a group of remote weather stations 114, which may provide the forecast without human intervention. Further, an emergency vehicle 124 may be alerted by an automated teller machine 120 that a burglary is in progress. As the emergency vehicle 124 proceeds towards the automated teller machine 120, it may access the traffic control group 106 to request clearance to the location, for example, by turning lights red to block cross traffic at an intersection in sufficient time for the emergency vehicle 124 to have unimpeded access to the intersection.

As described herein, as conditions change, some of the IoT devices may experience higher loadings, leading to higher latency, reduced performance, or lost data. For example, as the emergency vehicle 124 approaches the intersection, the increased communications between lights may overload controllers in the lights. accordingly, the traffic control group 106 may shift operations, such as light control, from the lights to other devices in the traffic control group 106, such as data aggregators, servers, or other devices. These devices may be located locally to the traffic control group 106, or may be accessed over a network. The devices used to implement the application may include the systems on the emergency vehicle 124 itself.

Clusters of IoT devices, such as the remote weather stations 114 or the traffic control group 106, may be equipped to communicate with other IoT devices as well as with the cloud 102. This may allow the IoT devices to form a virtual network between the devices, allowing them to function as a single device, which may be termed a fog device. The fog device is discussed further with respect to FIG. 2.

Figure 2:
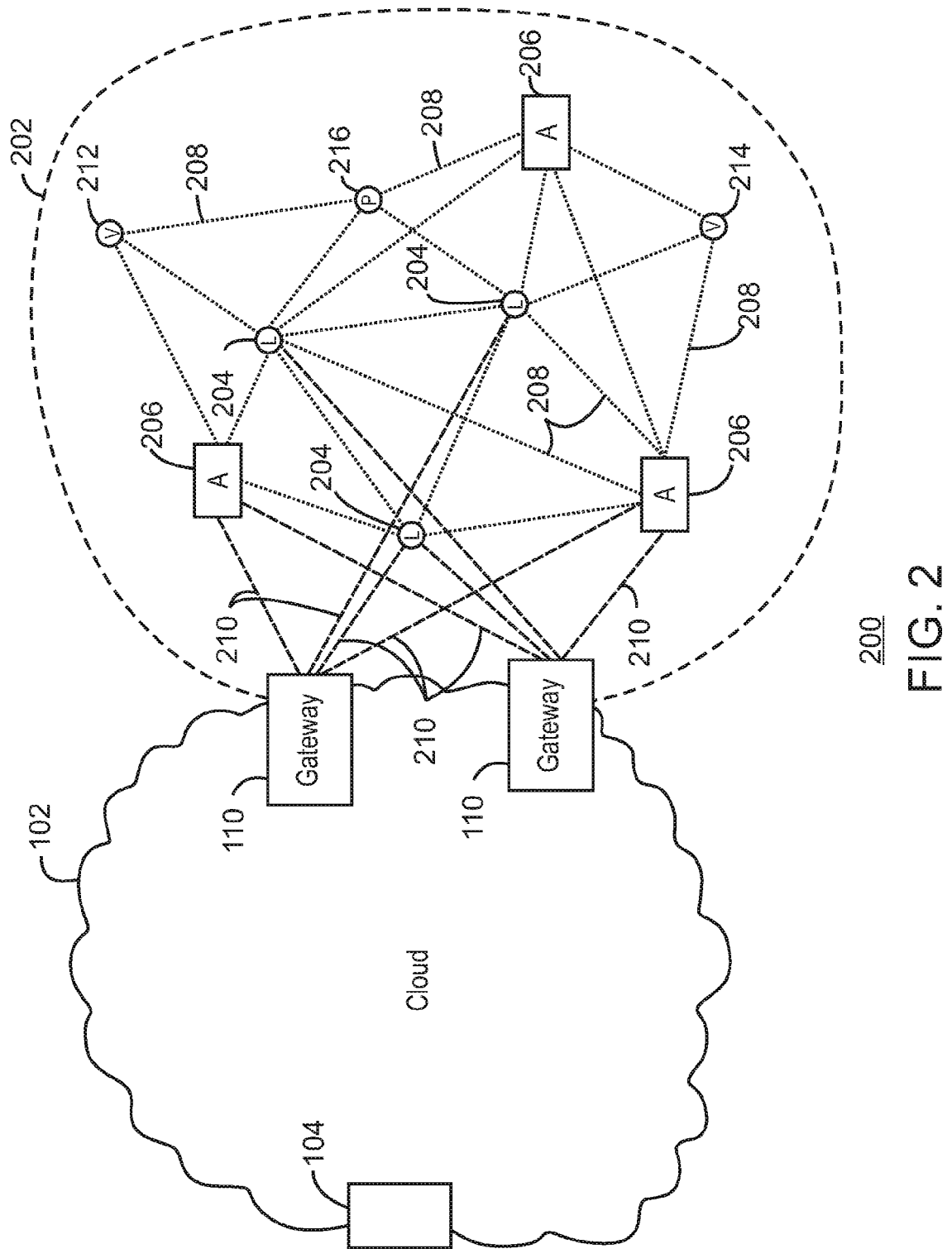
FIG. 2 is a drawing of a cloud computing network, or cloud, in communication with a mesh network of IoT devices, which may be termed a fog device, operating at the edge of the cloud in accordance with some embodiments.

FIG. 2 is a drawing 200 of a cloud computing network, or cloud 102, in communication with a network of IoT devices, which may be termed a fog device 202, operating at the edge of the cloud 102 in accordance with some embodiments. Like numbered items are as described with respect to FIG. 1. As used herein, a fog device 202 is a cluster of devices that may be grouped to perform a specific function, such as traffic control, weather control, plant control, home monitoring, and the like.

Objects, such as the IoT devices, may interact to accomplish a larger function, goal or workflow, for example, to form a fog device. Objects may be identified in terms of their type, e.g., the function performed, and instance, e.g., presence. Multiple object instances may have the same type identity, but may have unique instance identities. Further, multiple object instances may be organized into groups where an instance of the grouping may have an identity. A group of objects that interact in a particular way, given their type, for example, function, state and interface semantics, may represent a composite object. The composition itself may have a type and instance abstraction. Hence, composite objects follow the same identity rules as atomic objects. Composition with type and instance properties allows object extensibility through composition.

The object may last as long as a single device, such as a refrigerator, or only until a current function is completed. For example, a refrigerator may be regarded as a composite object, or fog device 202, consisting of multiple other objects, such as a light, a compressor, a temperature sensor, a thermostat, a water dispenser, an ice maker, and the like. The other objects may each be atomic, or may themselves be composite objects. For example, and ice maker may be composite object formed from atomic objects, such as a temperature sensor, a thermostat, a solenoid-operated water valve, a timer, an ice tray, and the like. An example of a virtual composite object, or fog device 202, made up of a number of physical devices is the intersection and the emergency cluster, described herein.

Accordingly, object identity may be understood in context of three abstractions, object instance, object type, and meta-identity. An object instance is a computational element that occupies finite resources, such as memory, CPU, bandwidth, status, and the like. Object instantiation has a lifecycle that involves creation, mutation, and deletion. An object type is a logical construct that declares expected or possible behavior, states, and composition. The object type can place constraints on how objects behave and interact when instantiated. The object type can also indicate the types of requests the object can respond to, for example, the interface.

Meta-identity is a way of defining a meta-data context in which the object may exist. An object may not be aware of encapsulating meta-identity. Object instances may dynamically apply stereotyping information by defining a group having desired meta-data context then enrolling the object into the group.

Authentication and identity are collated issues. An object identity cannot be believed if not authenticated. However, authentication without identity has limited utility. Asymmetric key signing, such as ECDSA (Elliptic Curve Digital Signature Algorithm), RSA, or the like, is useful for authentication under the expectation that the ability to replicate and distribute the private key is restricted. The use of the key establishes proof a principal or agent has access to the key though restricted. Hence, the principal or agent must be authentic.

The semantics of authentication, when applied to object identities, also follows the three abstractions of object instance, object type, and meta-identity. For an object instance, the authentication challenge-response establishes that the current interaction can only be with a particular instantiation of the object. For an object type, the authentication challenge-response attests that the current interaction is constrained by the semantics of type identification. For the meta-identity, the authentication challenge-response categorizes the current interaction according to the defined context.

Blockchains may be used to provide the information both for authentication and for formation of the devices. Blockchains may be used to decentralize identification as they may provide agreement between devices regarding names and identities that are in current use. As used herein, a blockchain is a distributed database of identity records that is made up of data structure blocks. Further, as used herein, the term blockchain may include any one or more of other distributed ledger systems. Other distributed ledger approaches include Ripple, Hyperledger, Multichain, Keyless Signature Infrastructure, and the like. Each data structure block is based on a transaction, where the issuance of a new name to a device, composite device, or virtual device is one example of a transaction.

Using blockchains for identification, impersonation may be detected by observing re-issuance of names and identities without a corresponding termination. Public blockchains may be most useful, as they can enable a diverse community of observers to detect misnaming, malicious naming, or failure of a naming infrastructure. Thus, trustworthy identity infrastructure may be central to trusting IoT networks.

Although the fog device 202 is shown as a mesh network in this example, using gateways 110 to communicate with devices in the cloud 102, the devices do not have to be part of a mesh network, or even proximate to each other to form a fog device. Thus, the devices do not have to be in direct radio or network communications with each other, or proximate to each other, but may form an ad hoc group based on function. The formation of the fog device 202 may be as simple as sharing naming, type, and identification information, for example, group identity credentials, between the different devices forming the fog device. This may allow any device to act as a representative of the fog device 202, with providing identity specific to the device. As an example, although the fog device 202 is this example is shown as being made up of devices in a single location, fog devices can include devices in multiple locations, formed to provide specific services. For example, the fog device 202 may include remote weather stations located in the cloud 102. Further, a server 104 located in a data center may be included in the fog device 102 for data analysis, and other services.

The orchestration techniques described herein may be used with fog devices or in IoT networks that do not include fog devices, such as described with respect to FIG. 1. In one example, orchestration may take place within a fog device to transfer workloads from overloaded devices to less loaded devices. Further, the orchestration techniques may be used between fog devices to transfer workloads from overloaded fog devices to less loaded fog devices. In any of these cases, the transfer of the workloads may be transparent to a user.

In this example, the fog device 202 includes a group of IoT devices at a traffic intersection. The fog device 202 may be established in accordance with specifications released by the OpenFog Consortium (OFC), among others. These specifications allow the formation of a hierarchy of computing elements between the gateways 110 coupling the fog device 202 to the cloud 102 and to endpoint devices, such as traffic lights 204 and data aggregators 206 in this example. The fog device 202 can leverage the combined processing and network resources that the collective of IoT devices provides. Accordingly, a fog device 202 may be used for any number of applications including, for example, financial modeling, weather forecasting, traffic analyses, and the like.

For example, traffic flow through the intersection may be controlled by a plurality of traffic lights 204, such as the three traffic lights 204 in this example. Analysis of the traffic flow and control schemes may be implemented by aggregators 206 that are in communication with the traffic lights 204 and each other through a mesh network. The implementation of the traffic flow applications may take place in the traffic lights 204, themselves. Data may be uploaded to the cloud 102, and commands received from the cloud 102, through gateways 110 that are in communication with the traffic lights 204 and the aggregators 206 through the mesh network.

Any number of communications links may be used in the fog device 202. Shorter-range radio links 208, for example, compatible with IEEE 802.15.4 may provide local communications between IoT devices that are proximate to the intersection. Longer-range radio links 210, for example, compatible with LPWA standards, may provide communications between the IoT devices and the gateways 110. To simplify the diagram, not every communication link 208 or 210 is labeled with a reference number. Further, not every device that participates in the fog device 202 needs to be located proximate to the other devices or indirect radio communications. For example, the fog device 202 may incorporate a weather station located on a different network. The naming and typing may identify if a particular IoT devices participating in a fog device 202.

Any one, or all, of the communications links 208 and 210 may be replaced with a wired connection between any two devices. Further, the network forming the fog device 202 does not have to be a mesh network, but may be a standard network in which each device is coupled to other devices through a wired or wireless connection to the gateways 110.

The fog device 202 may be considered to be an interconnected network wherein a number of IoT devices are in communications with each other, for example, directly by the communication links 208 and 210, through the cloud 102 via a network communications link, or through a gateway 110. For devices proximate to one another, the network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen alliance, the optimized link state routing (OLSR) Protocol, or the better approach to mobile ad-hoc networking (B.A.T.M.A.N.), among many others.

In some aspects, communications from one IoT device may be passed along the most convenient path to reach the gateways 110, for example, the path having the fewest number of intermediate hops, or the highest bandwidth, among others. In these networks, the number of interconnections provides substantial redundancy, allowing communications to be maintained, even with the loss of a number of IoT devices.

In some aspects, the fog device 202 can include temporary IoT devices. In other words, not all of the IoT devices may be permanent members of the fog device 202. For example, in the exemplary system 200, three transient IoT devices have joined the fog device 202, a first vehicle 212, a second vehicle 214, and a pedestrian 216. In these cases, the IoT device may be built into the vehicles 212 and 214, or may be an app on a smart phone carried by the pedestrian 216. Other IoT devices may also be present, such as IoT devices in bicycle computers, motorcycle computers, drones, and the like.

As described herein, the applications controlling the fog device may operate at any number of levels depending on a number of factors, such as the purpose of each device and the loading on the systems. For example, the traffic lights 204 may monitor sensors to identify approaching traffic, such as vehicles, pedestrians, bicycles, and the like, to implement a traffic control application. The sensors may be cameras that capture streaming video of the roadways and pass the streaming video to the traffic lights 204 for analysis. Under normal operations, the traffic lights 204 may cooperate with each other to determine which roadways have green lights and which roadways have red lights.

However, during periods when traffic is particularly heavy the traffic lights 204 may be overloaded. Accordingly, a traffic analysis task may be shifted to the data aggregators 206 or to the gateways 110. Further, the traffic analysis task may be shifted to other devices in contact with the traffic lights 204 as part of the fog device 202, such as the vehicles 212 and 214, or the server 104, depending on contact time, vehicle 212 or 214 capability, network latency, and the like. Once the loading returns to normal, the traffic analysis task may be shifted back to the traffic lights 204.

The fog device 202 formed from the IoT devices may be presented to clients in the cloud 102, such as the server 104, as a single device located at the edge of the cloud 102. In this example, the control communications to specific resources in the fog device 202 may occur without identifying any specific IoT device within the fog device 202. Accordingly, if one IoT device within the fog device 202 fails, other IoT devices in the fog device 202 may be able to discover and control a resource, such as an actuator, or other device attached to an IoT device. For example, the traffic lights 204 may be wired so as to allow any one of the traffic lights 204 to control lights for the other traffic lights 204. The aggregators 206 may also provide redundancy in the control of the traffic lights 204 and other functions of the fog device 202.

In some examples, the IoT devices may be configured using an imperative programming style, e.g., with each IoT device having a specific function and communication partners. However, the IoT devices forming the fog device 202 may be configured in a declarative programming style, allowing the IoT devices to reconfigure their operations and communications, such as to determine needed resources in response to conditions, queries, and device failures. This may be performed as transient IoT devices, such as the pedestrian 216, join the fog device 202.

A combination of IoT devices using an imperative programming style and devices declarative programming style may be used in applications. For example, more general purpose IoT devices may have the power to operate a declarative programming style to adapt to conditions that are changing. More constrained IoT devices, such as sensor devices, may not have the programming power to include more adaptive software.

As the pedestrian 216 is likely to travel more slowly than the vehicles 212 and 214, the fog device 202 may reconfigure itself to ensure that the pedestrian 216 has sufficient time to make it through the intersection. This may be performed by forming a temporary group of the vehicles 212 and 214 and the pedestrian 216 to control the traffic lights 204. If one or both of the vehicles 212 or 214 are autonomous, the temporary group may instruct the vehicles to slow down prior to the traffic lights 204.

As the transient devices 212, 214, and 216, leave the vicinity of the intersection the fog device 202, the fog device 202 may reconfigure itself to eliminate those IoT devices from the network. As other transient IoT devices approach the intersection, the fog device 202 may reconfigure itself to include those devices.

The fog device 202 may include the traffic lights 204 for a number of intersections, such as along a street, along with all of the transient IoT devices along the street. The fog device 202 may then divide itself into functional units, such as the traffic lights 204 and other IoT devices proximate to a single intersection. This type of combination may enable the formation of larger IoT constructs, e.g., groups of IoT devices that perform a particular function, in the fog device 202.

For example, if an emergency vehicle joins the fog device 202, an emergency construct, or virtual device, may be created that includes all of the traffic lights 204 for the street. This may allow the control of the traffic flow patterns for the entire street. The emergency construct may include a number of applications and functional blocks activated from a task image repository in the fog device 202, or downloaded to the fog device 202 from the server 104 or other devices in the cloud 102. Further, the task images may be downloaded from an emergency vehicle that joins the fog device 202.

The emergency construct may use the deployed applications to determine the location and roadway for the emergency vehicle. Applications may then instruct the traffic lights 204 along the street to stay red for opposing traffic and green for the emergency vehicle, expediting the passage of the emergency vehicle.

As illustrated by the fog device 202, the organic evolution of IoT networks is central to improving or maximizing the utility, availability and resiliency of IoT implementations. The use of applications that are shifted to different computing devices may increase the adaptability of the fog device 202, for example, providing easier incorporations of new functions. This is discussed further with respect to FIGS. 3 and 4.

Figure 3:
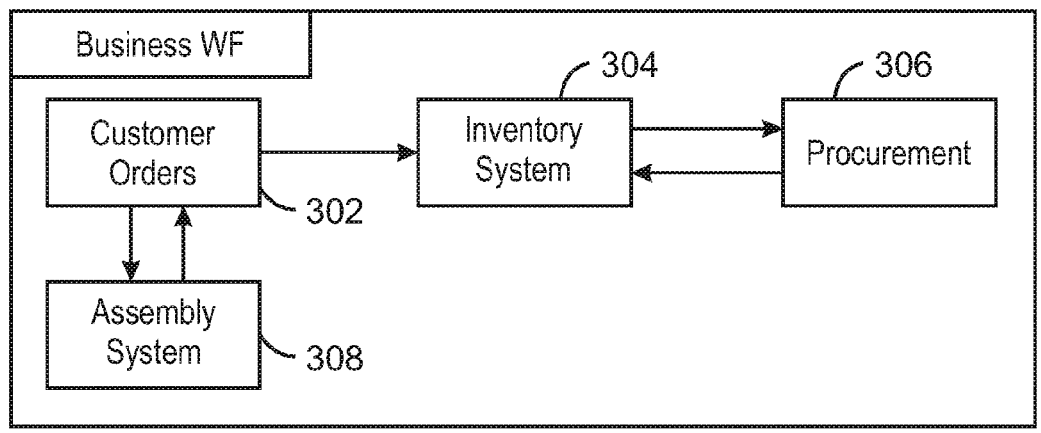
FIG. 3 is a block diagram of a business workflow in accordance with some embodiments.

FIG. 3 is a block diagram of a business workflow 300 in accordance with some embodiments. The business function in this example is in an automotive plant that manufactures cars. A simplistic view of the components involved in implementation might include incoming order management 302, inventory management 304, procurement 306, and assembly 308. These may interact as shown in FIG. 3. The components may be implemented as a number different applications and tasks, as described herein, by a development and operations team, and may be automatically deployed onto the available resources.

Figure 4:
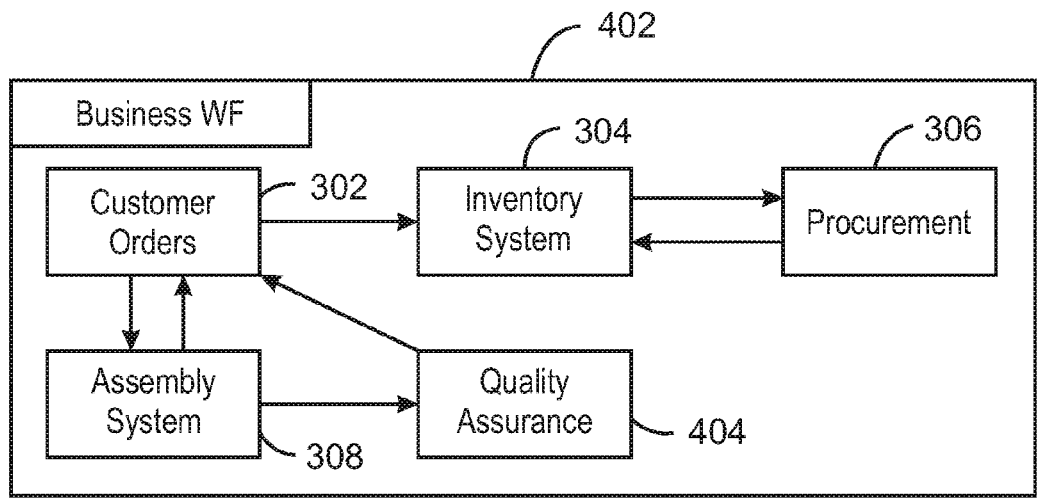
FIG. 4 is a block diagram of an enhanced business workflow in accordance with some embodiments.

FIG. 4 is a block diagram of an enhanced business workflow 402 in accordance with some embodiments. Like numbered items are as described with respect to FIG. 3. A business change may have a new component that may be implemented in the enhanced business function 402. For example, a quality assurance component 404 may be developed by the development and operations team. The new data pipeline may then be defined by the business team, including the new module, and deployed, without the business team needing to understand the details of the underlying software modules or infrastructure. This is further described in the example discussed with respect to FIGS. 5 to 9. Further, any details about the enhanced business workflow 402 and the functional blocks or tasks may be displayed in any of the I/O embodiments described herein. The display may include user interaction options if needed by the system configuration selected. Thus, the QA data from the quality assurance component 404 may be displayed on a control panel associated with a control console, an IoT device, or a remote proxy server used to access the data without allowing control. For example, the data may be displayed on an engineering work console that does not have control access to the plant.

Figure 5A:
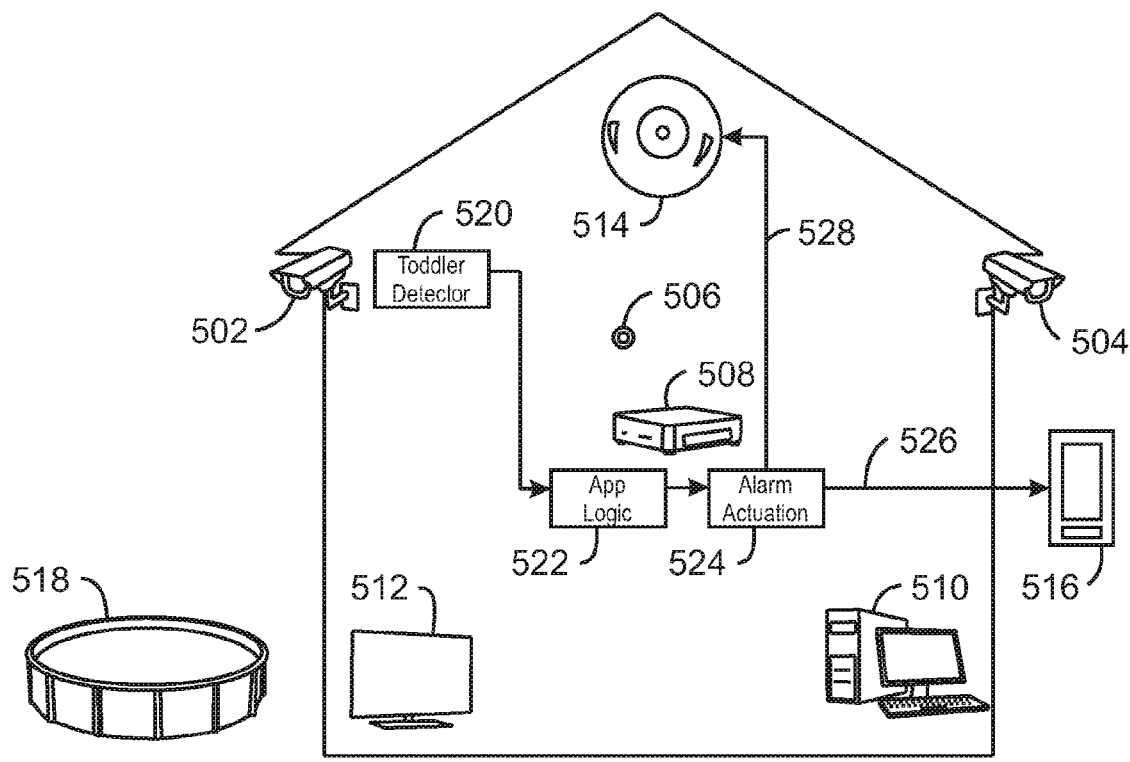
FIGS. 5(A)-5(E) are schematic diagrams of an example of an Internet-of-Things (IoT) system transferring operations between devices in accordance with some embodiments.

FIGS. 5(A)-5(E) are schematic diagrams of an example of an Internet-of-Things (IoT) system transferring operations between devices in accordance with some embodiments. FIG. 5(A) is a schematic drawing of an example of a smart home environment 500 that includes sensing nodes, compute nodes, and actuation nodes. The sensing nodes may include cameras 502 and 504, microphones 506, and the like. The compute nodes may include a gateway 508, a personal computer (PC) 510, and the like. The actuation nodes may include a TV 512, and alarm 514, a mobile phone 516, and the like. The mobile phone 516 may be in communication with the gateway 508 via a service provider, via a radio signal, or both. The radio signal may include a Wi-Fi® signal, a Bluetooth® signal, or both.

In this example, a homeowner may decide to install a pool monitor application to identify unauthorized access to a pool 518. The pool monitor application may be obtained from a microservice provider that makes microservices, or code enhancements, commercially available. The home automation system may automatically deploy various parts of the pool monitor application to various nodes in their home. Initially, a computer vision algorithm, termed a toddler detector 520, may be installed directly onto the backyard camera 502. The toddler detector 520 may identify the presence of people and children in the vicinity of the pool 518. Application logic 522 may be installed on the gateway 508 to determine if a child is in the backyard and an adult is not present. Alarm actuation logic 524 may be installed on the gateway 508 to activate an alert, for example, sending an alert message 526 to the mobile phone 516, sending an actuation signal 528 to the alarm 514, or both.

Figure 5B:
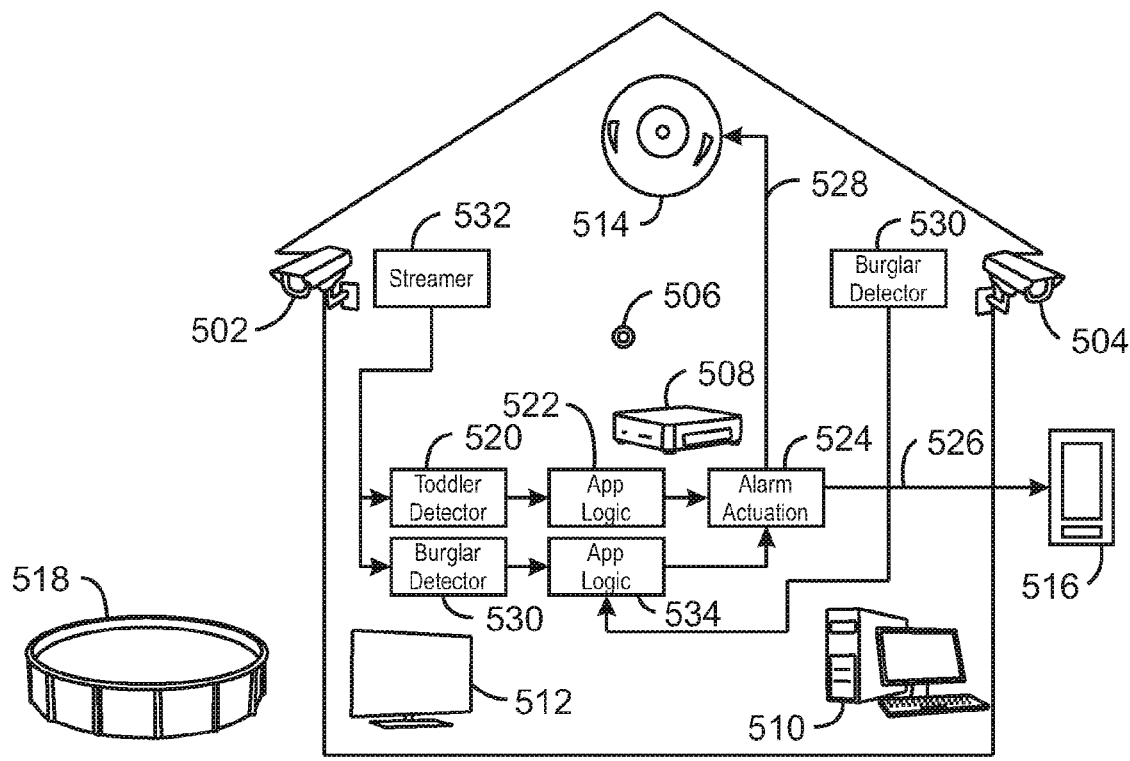

As illustrated in FIG. 5(B), a home security application may be subsequently activated in addition to the pool monitor application. Scene analysis algorithms, termed a burglar detector 530, may be deployed to analyze the front and backyard camera feeds to determine if an unauthorized person is present. The burglar detector 530 may be deployed on the front yard camera 504. However, the backyard camera 502 may not be able to accommodate both the toddler detector 520 and the burglar detector 530. Accordingly, the pool monitor application may be reconfigured. A streamer 532 may be deployed to the backyard camera 502, and both video analysis algorithms 520 and 530 may be deployed on the gateway 508. The application logic 534 for the home security application may also be deployed on the gateway 508, activating the alarm actuation logic 524 to send an alert message 526, sound the alarm 514, or both, if an unauthorized person is detected or an unaccompanied child is in the vicinity of the pool 518. Although the deployment reduces the available bandwidth of the home network, it allows the desired result to be achieved.

Figure 5C:
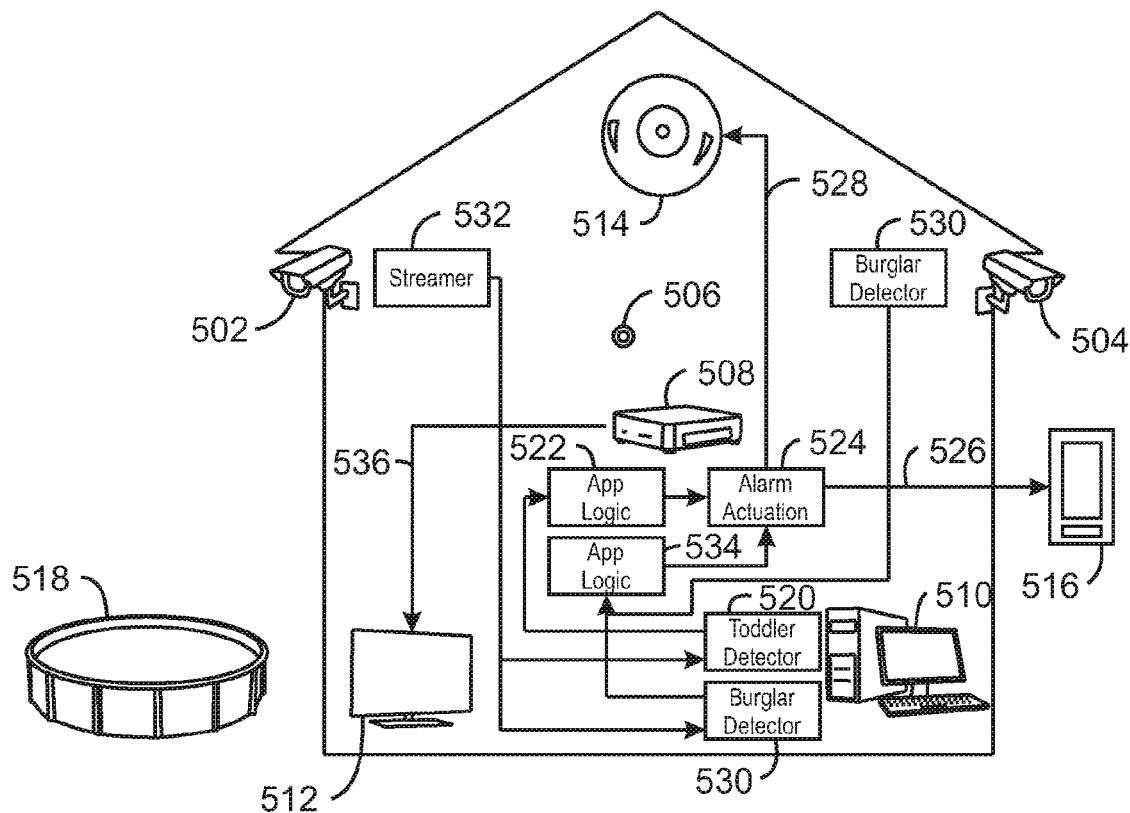

As illustrated in FIG. 5(C), a video stream 536 may be transcoded and sent from the gateway 508 to a TV 512 for viewing. The extra load may be too much for the gateway 508, so the video analysis algorithms 520 and 530 may be automatically redeployed to the PC 510.

Figure 5D:
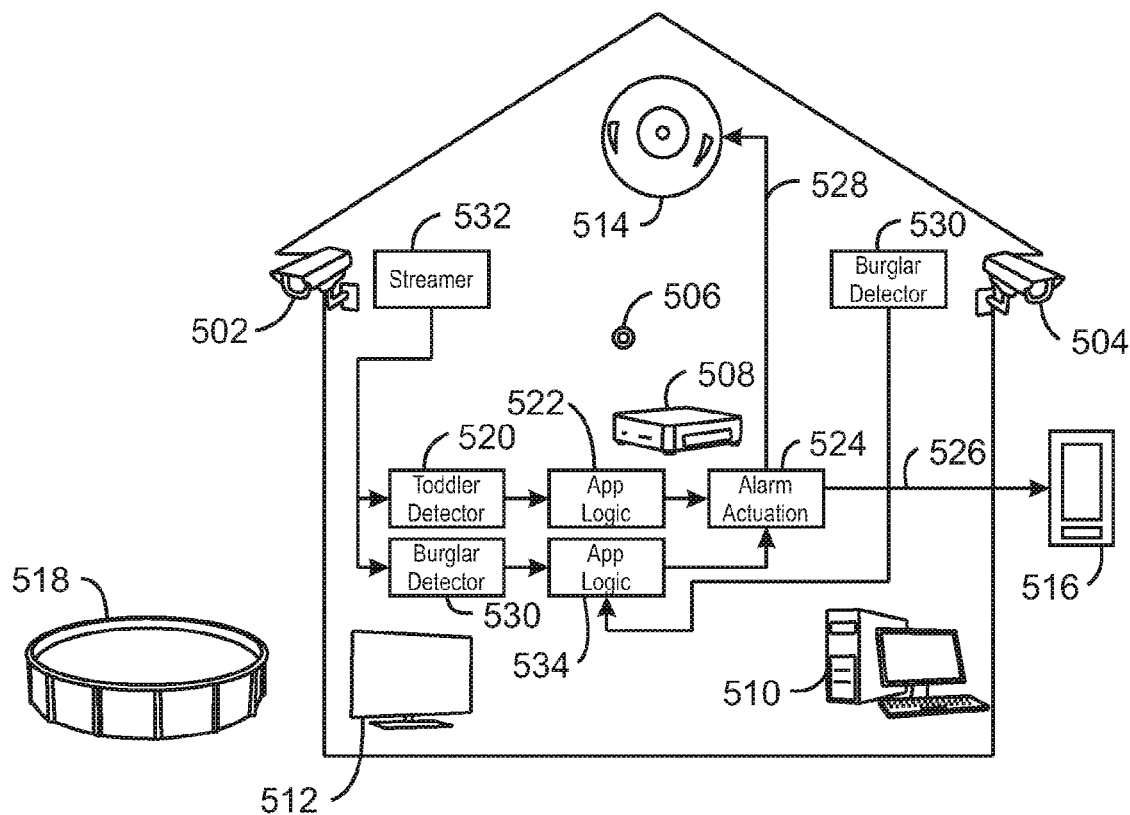

As illustrated in FIG. 5(D), after the video stream 536 is terminated, the video analysis algorithms 520 and 530 may be moved back to the gateway 508. This may allow the PC 510 to go into a reduced power mode or be used for other applications by a user at the console.

Figure 5E:
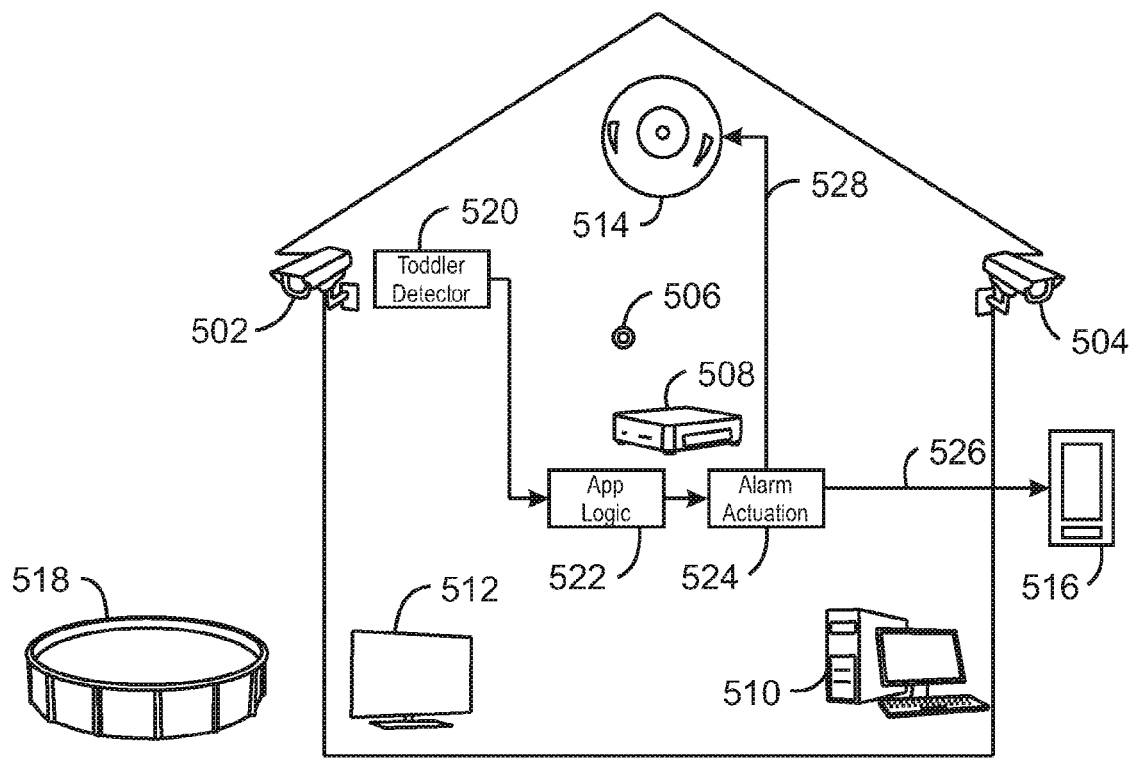

As Illustrated in FIG. 5(E), the home security application may be disabled, allowing the toddler detector 520 to be moved back to the backyard camera 520. This reduces the bandwidth requirements on the home network. Thus, the software configurations may be dynamically changing as driven by user or business needs.

FIG. 6 is a schematic diagram of an example of an application 602 being packaged into containers 604, which are then provisioned to systems 606 in accordance with some embodiments. As used herein, containers are software wrappers that allow a code segment to run under different operating systems, hardware, and the like.

The approach is to decompose the application 602 into components, or tasks 608, and dynamically orchestrate the deployment of those tasks 608 onto physical devices in the systems 606. The containers 604 may include containers 604 designed for deployment to different hardware platforms and operating systems. For example, containers 604 may be included for allowing tasks 608 to operate in virtual machine (VMs), floating point gate arrays (FPGAs), devices with specialized hardware, such as sensors, actuators, and the like, and systems 606 that use the Intel® security guard extensions (SGX) for secure operations, among many others.

The task 608, and the containers 604, may be provided from a service provider in the cloud, or from firmware or software connected to the network, such as a thumb drive, among others. The service provider may be, for example, the vendor of one of the devices used, such as the cameras, the gateway, or the PC, among others. The application that combines the task 608 together into, for example, functional blocks, may also be obtained from a vendor, or from a general micro services provider located in the cloud.

The use of the containers 604 allows tasks 608 to be repackaged into other containers 604 for deployment to different systems 606 without rewriting the code of the tasks 608. Thus, the containerized tasks 610 may be deployed and dynamically redeployed across heterogeneous networks of systems 606. The orchestration of the deployment may include IoT devices 612, edge computing devices 614, such as CSP devices based on the Android O/S, gateways and fog devices 616, or cloud infrastructure. As needs and loading change, the containerized tasks 610 may be automatically shifted, as indicated by arrows 618, between different systems 606. The target systems 606 may request containerized tasks 610 be provided by an orchestration system, or that the orchestration system build new components if needed.

Figure 7:
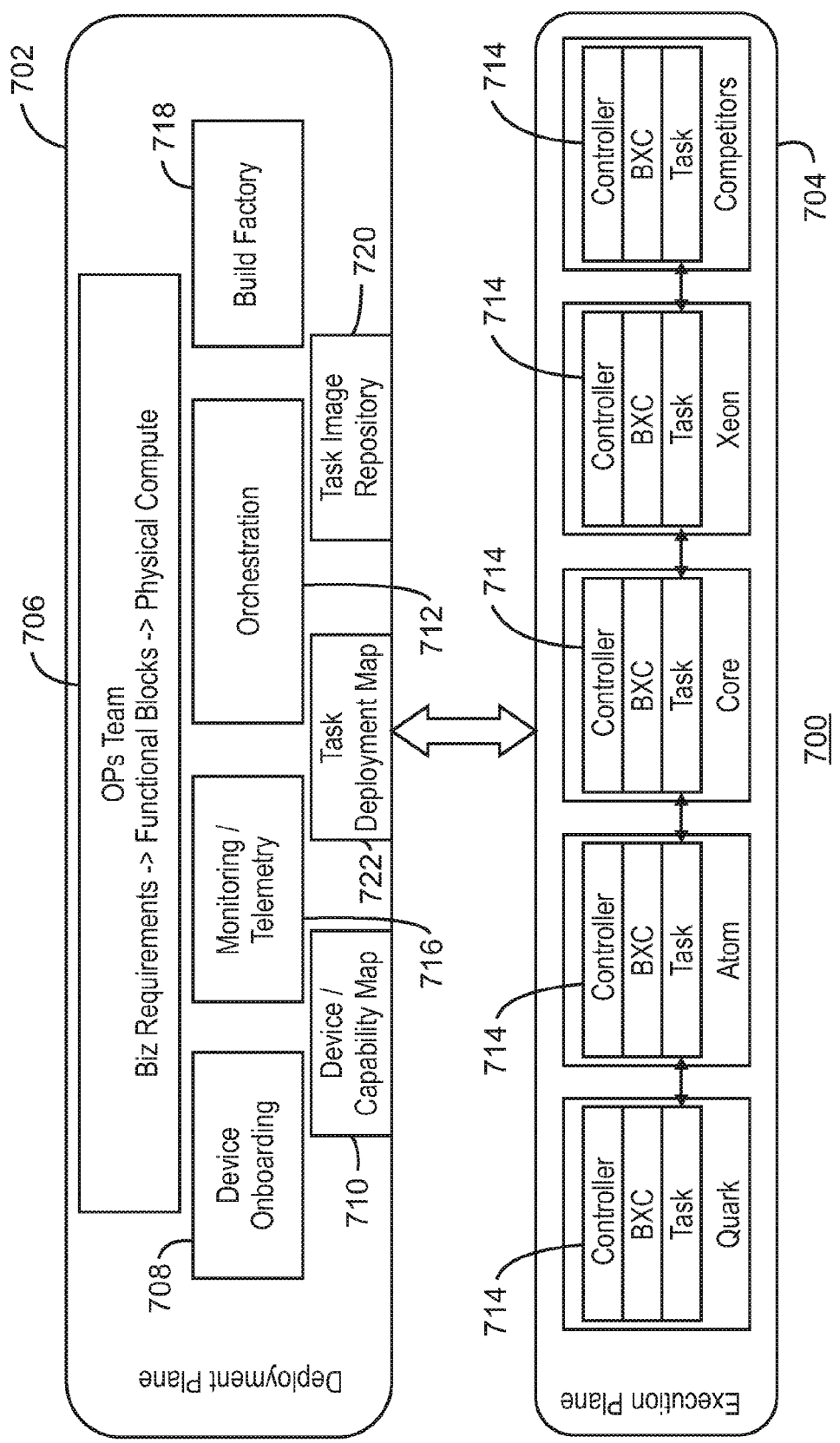
FIG. 7 is a schematic diagram showing a provisioning system including a deployment plane and execution plane in accordance with some embodiments.

FIG. 7 is a schematic diagram showing a provisioning system 700 including a deployment plane 702 and execution plane 704 in accordance with some embodiments. The deployment plane 702 includes the initial manual functions 706 performed by the development and operations team, such as defining the business requirements, coding or obtaining the initial functional blocks, and the deployment of the physical infrastructure. The deployment plane 702 also includes a number of automated functions, such as a mechanism for on-boarding 708 new devices in the execution plane 704. These devices are added to the device/capability map 710, which is used for orchestrating the deployment of applications and functions by an orchestration device 712.

Each on-boarded device in the execution plane includes a Controller functionality 714 which manages the deployment of software components and measures available resources, such as CPU and memory utilization, network bandwidth, security status, and the like. Resource utilization measured by the devices are also fed to the device/capability map 710 by a Monitoring/Telemetry tool 716. The components may be packaged into containers by a build factory 718. The containerized components are stored in a task image repository 720 for future use. A task deployment map 722 may be used to track where the individual containerized components of an application are to be deployed.

As described herein, an application may be created to implement a workflow. The workflow may be made up of interconnected functional blocks, which may be made up of other functional blocks and tasks.

Figure 8:
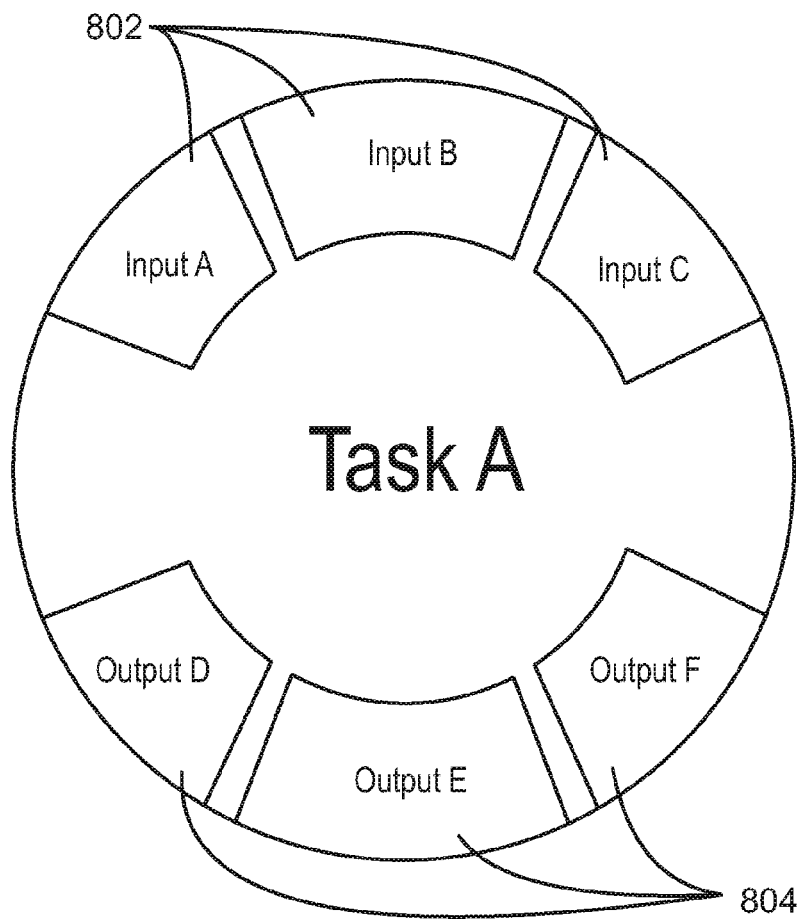
FIG. 8 is a drawing of an example of a task that may be deployed in accordance with some embodiments.

FIG. 8 is a drawing of an example of a task 800 that may be deployed in accordance with some embodiments. The task 800 may be considered to be the smallest deployable software unit, for example, the task 800 may be considered to be the component 608 described with respect to FIG. 6. Thus, the task 800 may be packaged in a software container, such as a virtual machine container or a docker, among others. The task 800 may include a set of inputs 802 to connect to other tasks. The task 800 may also include a set of outputs 804, which are intended to provide data and results to other tasks or to users. The data may be provided on a control console, a display associated with an IoT device, a remote proxy server, or on any other input-output devices described herein. The display may include user interaction options if needed by the system configuration selected.

The task 800 may also include a set of requirements that indicate the environment required for the task 800. The requirements may be static, such as the hardware required for the task, or dynamic, such as CPU demand, memory demand, sensor requirements, and the like.

Figure 9:
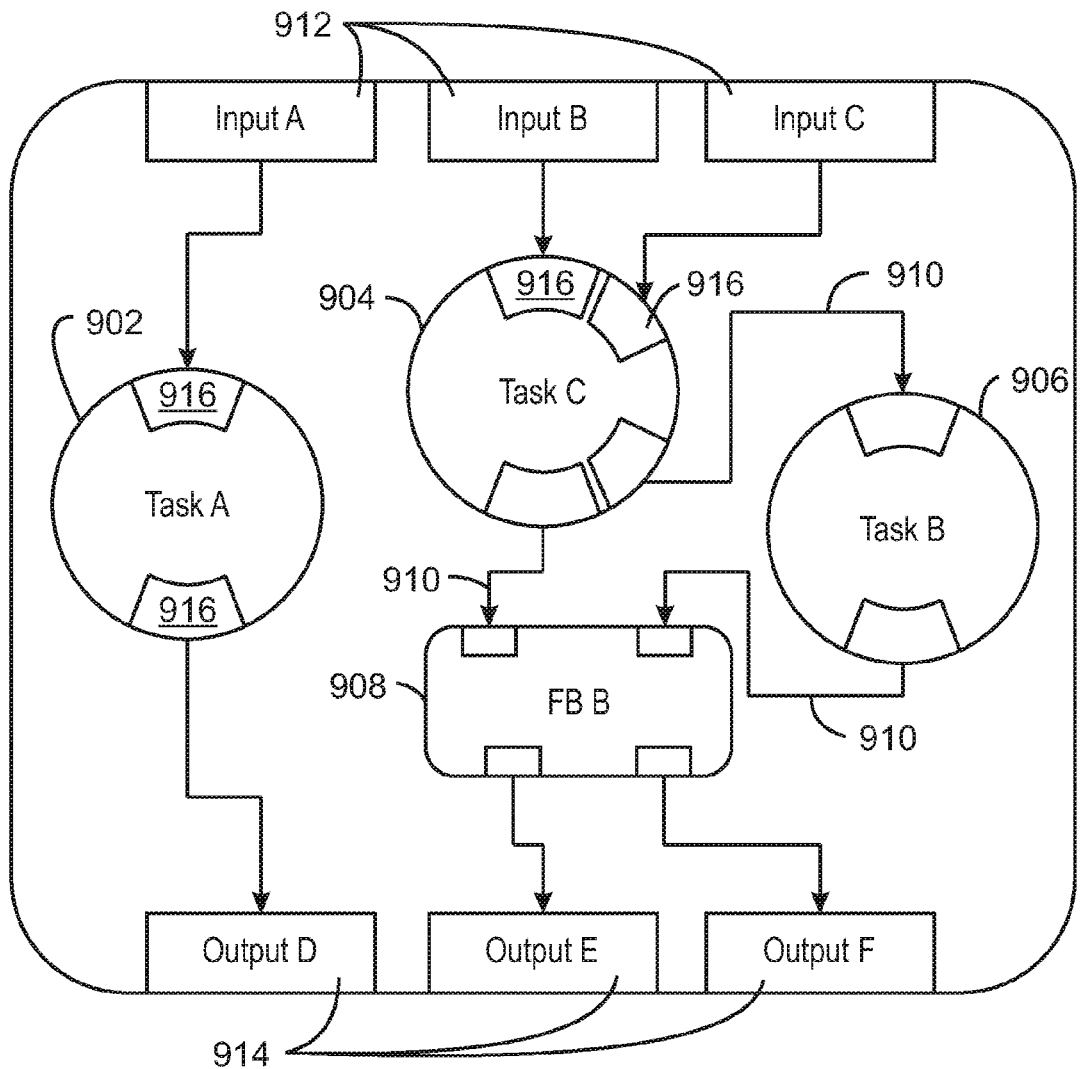
FIG. 9 is a drawing of an example of a functional block that includes multiple tasks in accordance with some embodiments.

FIG. 9 is a drawing of an example of a functional block 900 that includes multiple tasks 902, 904, and 906 in accordance with some embodiments. The functional block 900 also includes another functional block, FB B 908, which may include other tasks and functional blocks. The functional block 900 may specify the interconnections 910 between the interfaces of these internal components. Each interconnect can be one-to-one, one-to-many, or many-to-one.

The functional block 900 has input interfaces 912 and output interfaces 914, which may be a logical reflection of functional block and task interfaces 916 that are accessible outside of the functional block 900. The internal structure of the functional block 900 is hidden from the rest of the systems, so only the exposed interfaces 912 and 914 can be connected to components outside of the functional block 900.

Each of the tasks 902-906, as well as tasks within FB B 908 may be containerized in an individual container. Thus, the different tasks 902-906 and FB B 908 may be operating on the same or different systems. The containers may track the location, such as the network address, of the tasks 902-906 and FB B 908 to determine where to obtain the inputs 912 or to provide the outputs 914. Similar to tasks, the functional block 900 has deployment requirements, which include the requirements of the components, such as tasks 902-906 and FB B 908, as well as the networking requirements of the interconnections 910.

Figure 10:
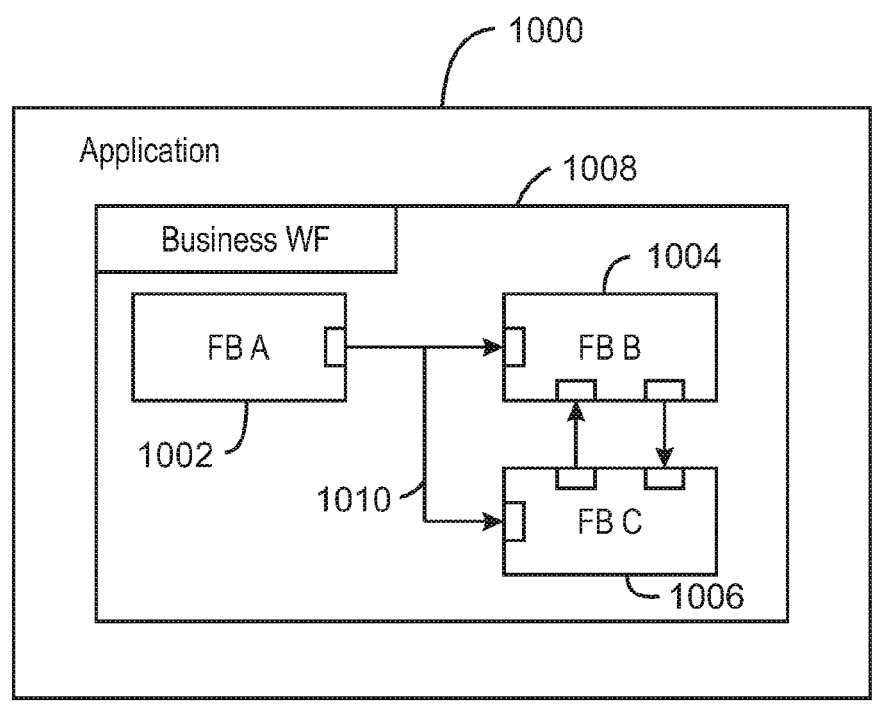
FIG. 10 is a drawing of an example of an application that includes multiple functional blocks in accordance with some embodiments.

FIG. 10 is a drawing of an example of an application 1000 that includes multiple functional blocks 1002-1006 in accordance with some embodiments. The application 1000 may be defined by a business workflow 1008. The business workflow 1008 may be made up of functional blocks 1002-1006 and their interconnections 1010. The application 1000 may have deployment requirements that include the deployment requirements of functional blocks 1002-1006. Together, the concepts of applications, functional blocks, and tasks allow business processes to be developed which may then be dynamically mapped to the implementation domain, such as software modules that may be deployed to nodes, or physical devices, in an IoT network. For example, the auto manufacturing example of FIG. 3 may be built as described with respect to FIG. 11.

Figure 11:
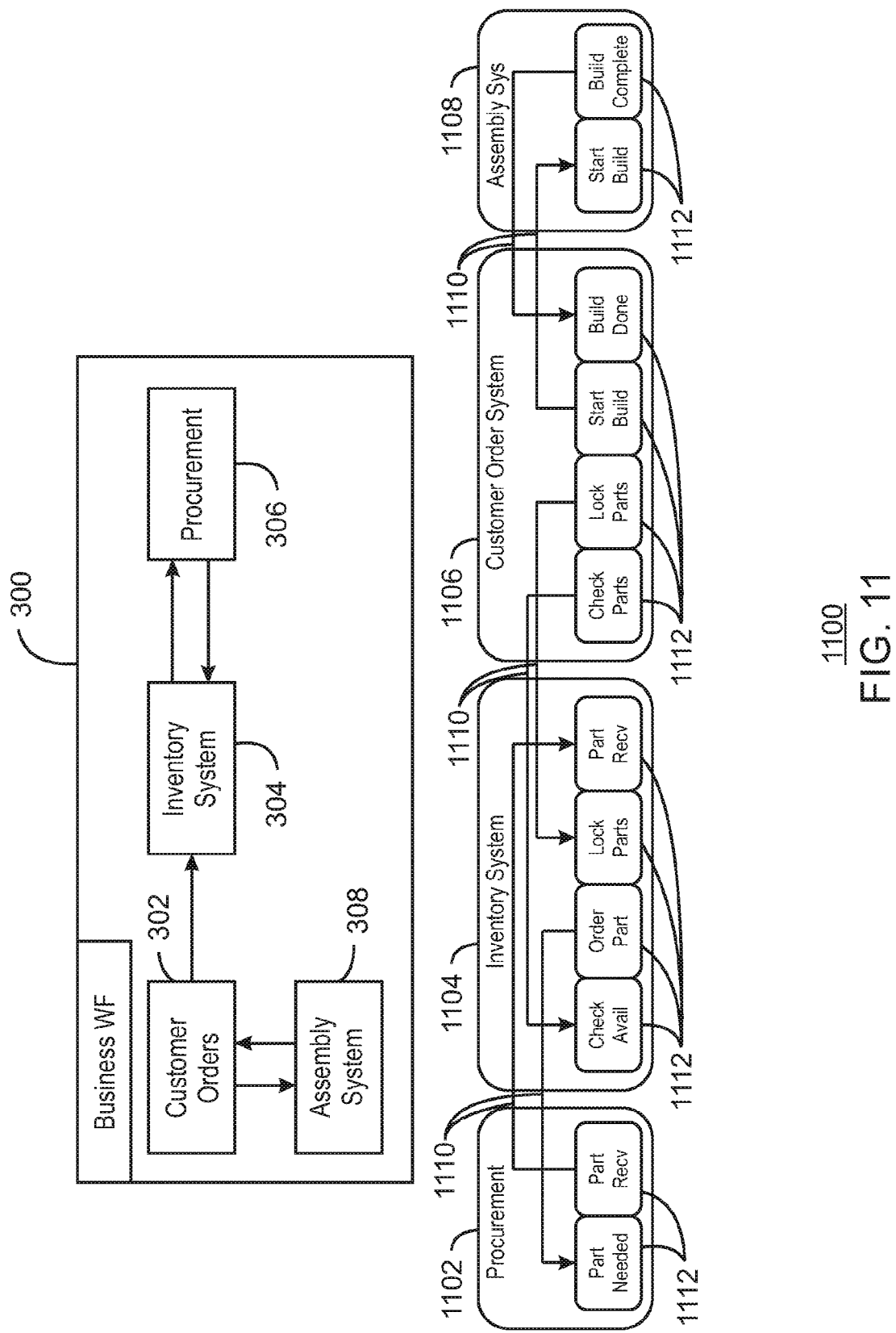
FIG. 11 is a block diagram of an example of the implementation of the business workflow of FIG. 3, implemented using an application that includes four functional blocks (FB) in accordance with some embodiments.

FIG. 11 is a block diagram of an example of the implementation of the business workflow 300 of FIG. 3, implemented using an application that includes four functional blocks (FB) in accordance with some embodiments. The four functional blocks include a procurement FB 1102, an inventory FB 1104, a customer order FB 1106, and an assembly system FB 1108. The FBs 1102-1108 may have interconnections 1110 as illustrated in FIG. 11. Each of the FBs 1102-1108 may have a number of tasks interfaces 1112 that access tasks and lower level functional blocks used to implement the application.

Figure 12:
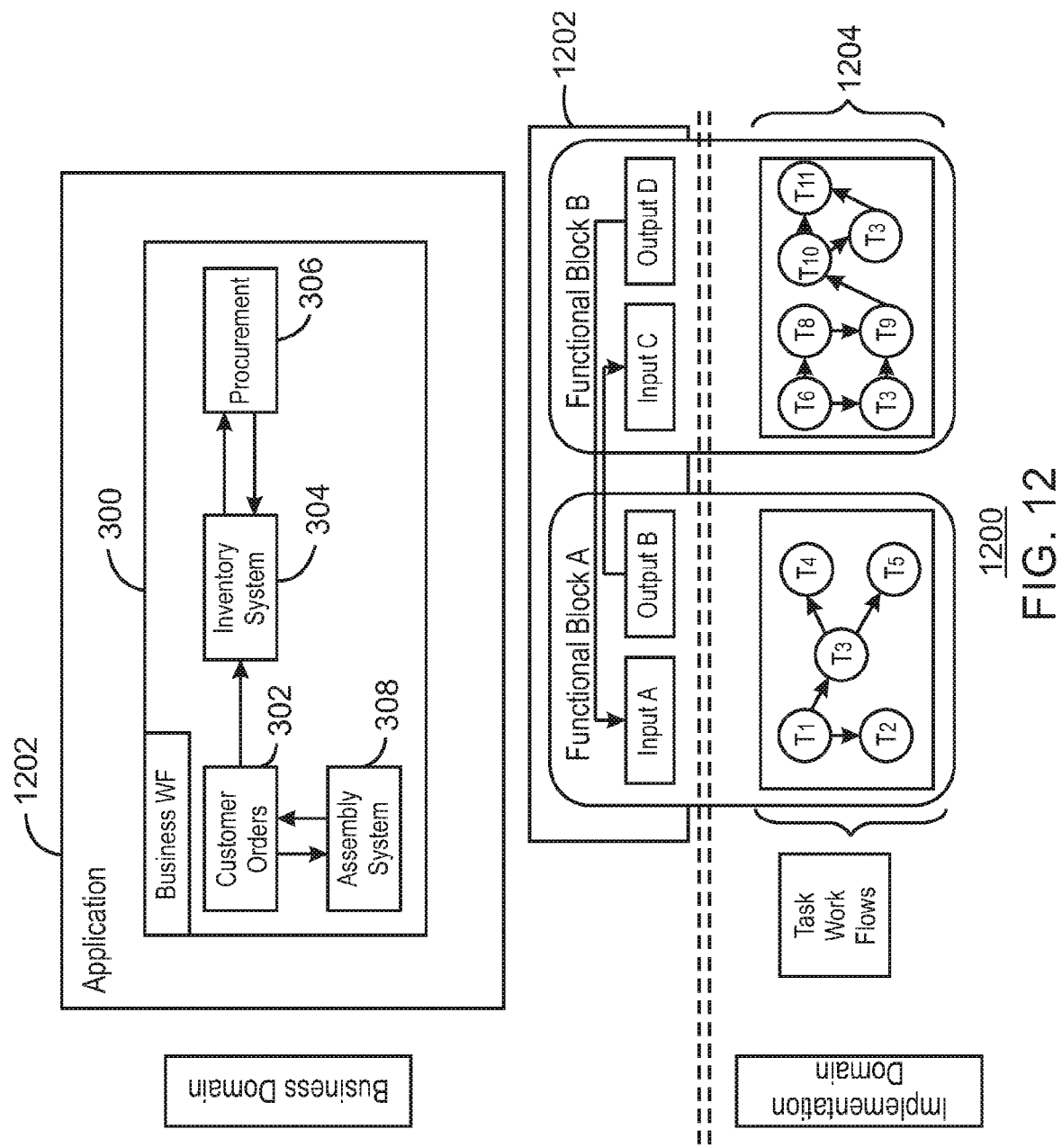
FIG. 12 is a schematic diagram of an example of mapping the implementation of FIG. 3 to tasks in accordance with some embodiments.

FIG. 12 is a schematic diagram of an example of mapping the implementation of FIG. 3 to tasks 1204 in accordance with some embodiments. In FIG. 12, a business workflow, 1202 includes functional blocks A and B. The interconnections of the FBs A and B may be mapped to the inputs and outputs of the individual tasks 1204, e.g., T1 to T11, making up the workflow.

Figure 13:
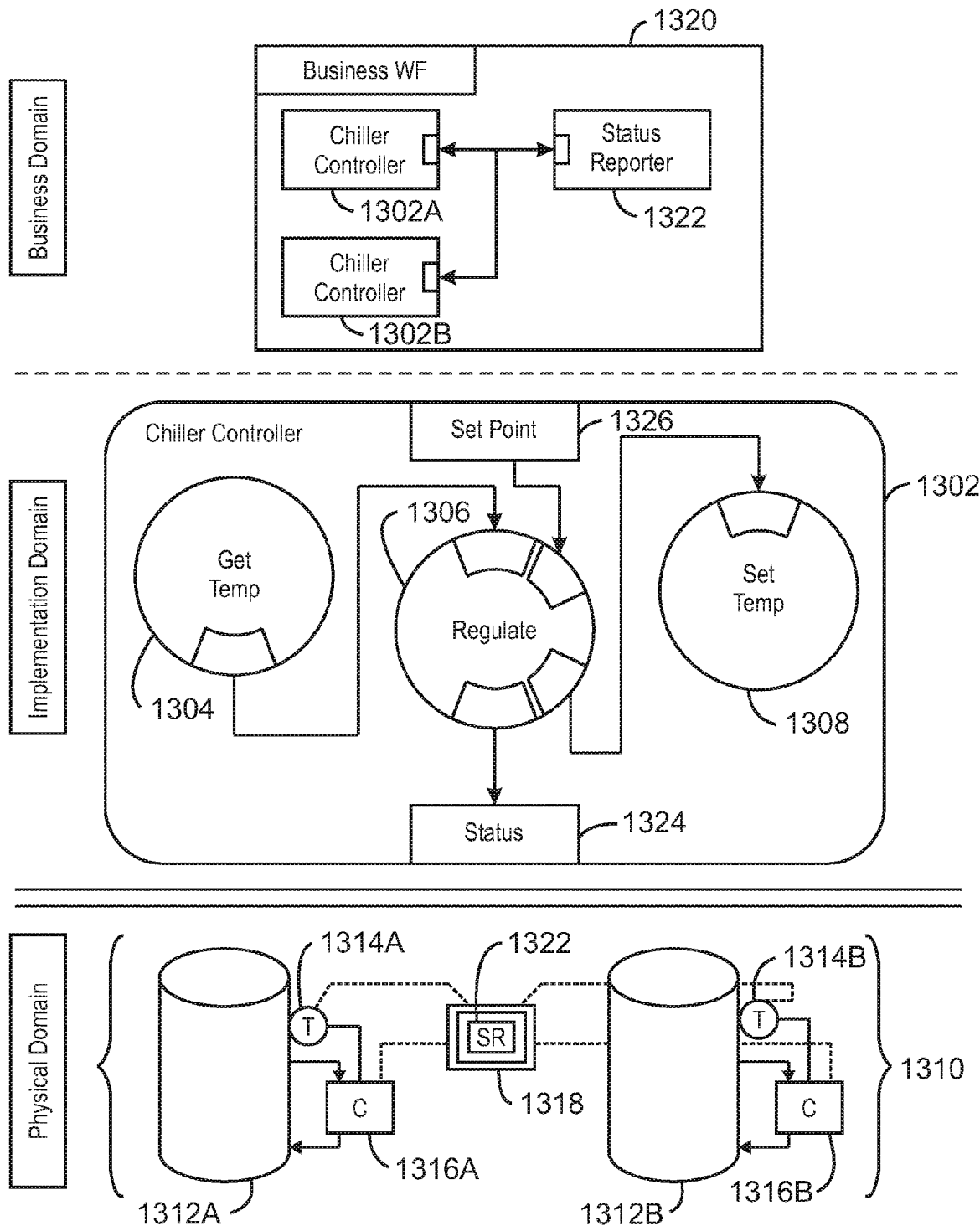
FIG. 13 is a schematic diagram of an example of the implementation of chiller controller FBs, where each chiller controller FB includes containerized tasks in accordance with some embodiments.

FIG. 13 is a schematic diagram of an example of the implementation 1300 of chiller controller FBs 1302, where each chiller controller FB 1302 includes containerized tasks 1304-1308 in accordance with some embodiments. In this example, an industrial plant 1310 includes storage tanks 1312A and B that are chilled to maintain a given storage temperature for the contents. Each tank 1312A and B includes a temperature sensor 1314A and B, and a chiller 1316A and B that maintains the desired temperature. The temperature sensors 1314A and B, chillers 1316A and B, or both, may include nodes that have processing capability in addition to sensing and control functions. Further, all of these units may be in communication with a control console 1318 for setting temperature setpoints and monitoring operational status.

The tanks and associated sensing and control equipment may be defined in the device/capability map as shown in the following JSON code segment:

```
[
  {
    "Name": "EastStorageTank",
    "Role": "StorageTank",
    "Elements": [
      {
        "Name": "Temp",
        "Role": "TempSensor",
        "DeviceID": "1384772928737",
        "Model": "abc123"
      },
      [
        "Name": "Chiller",
        "Role": "TempController",
        "DeviceID": "1930405820249",
        "Model": "Z100"
      }
    ]
  },
  {
    "Name": "WestStorageTank",
    "Role": "StorageTank",
    "Elements": [
      ...
    ]
  }
]
```

As shown in the JSON code, the device/capability map may include a list of named elements that correspond to the physical units. The first two names elements have the Role "StorageTank," corresponding to the physical storage tanks 1312A and B. Each of the Storage Tank elements include two further named elements, one with Role "TempSensor" corresponding to the temperature sensors 1314A and B, and one with Role "TempController", corresponding to the chillers 1316A and B.

Based on these structures, and the operational goal, a business workflow 1320 may be generated for this plant. The Chiller Controller FBs 1302A and B may be defined to maintain a set point temperature for a given tank 1312A or B. A chiller controller FB 1302 needs a node of role "TempSensor" operated by a task termed get temp 1304 and a node of role "TempController", operated by a task called regulate 1306. The regulate task 1306 provides an output to a task called set temp 1308 which activates or deactivates a chiller 1316.

Since the plant has two chillers, the Business Workflow includes two chiller controller FBs 1302A and B, one mapped to the "EastStorageTank" 1312B and one mapped to the "WestStorageTank" 1312A. Each is linked to a Status Reporter module 1322, which may be located in a control console 1318, in a node near a tank 1312A or B, or both. A control console 1318 may accept a status output 1324, for example, in a status reporter 1322, from the chiller controller FB 1302 unit 1314A and 1316. A setpoint input 1326 to the regulate task allows the setpoint for the temperature for each tank 1312A or B to be set. The control console 1318, or displays associated with any of the nodes, may be used to display or enter setpoints, and status, of the units described herein and in the JSON code segment above. The elements being controlled may be identified by the keywords used in the JSON code segment.

As described herein, the tasks 1304 to 1308 do not have to be in fixed locations. For example, if a node associated with the tank, such as a chiller node, is used for both controlling the temperature of a tank and for controlling the filling or emptying of the tank, during the filling operation, the regulate task 1306 may be shifted to another node, such as a temperature control node, or to the control console.

The application 1320 specifies two clusters of devices. However, it is possible to define an application that creates N chiller controllers 1302, for N elements in a device/capability map with a role of "StorageTank". Further, as shown in the JSON segment, the device/capability map is hierarchical, matching the hierarchical nature of functional blocks, which may be made of other functional blocks and tasks. Accordingly, physical hierarchies may be created, for example, building A, floor 4, chiller 12.

Figure 14:
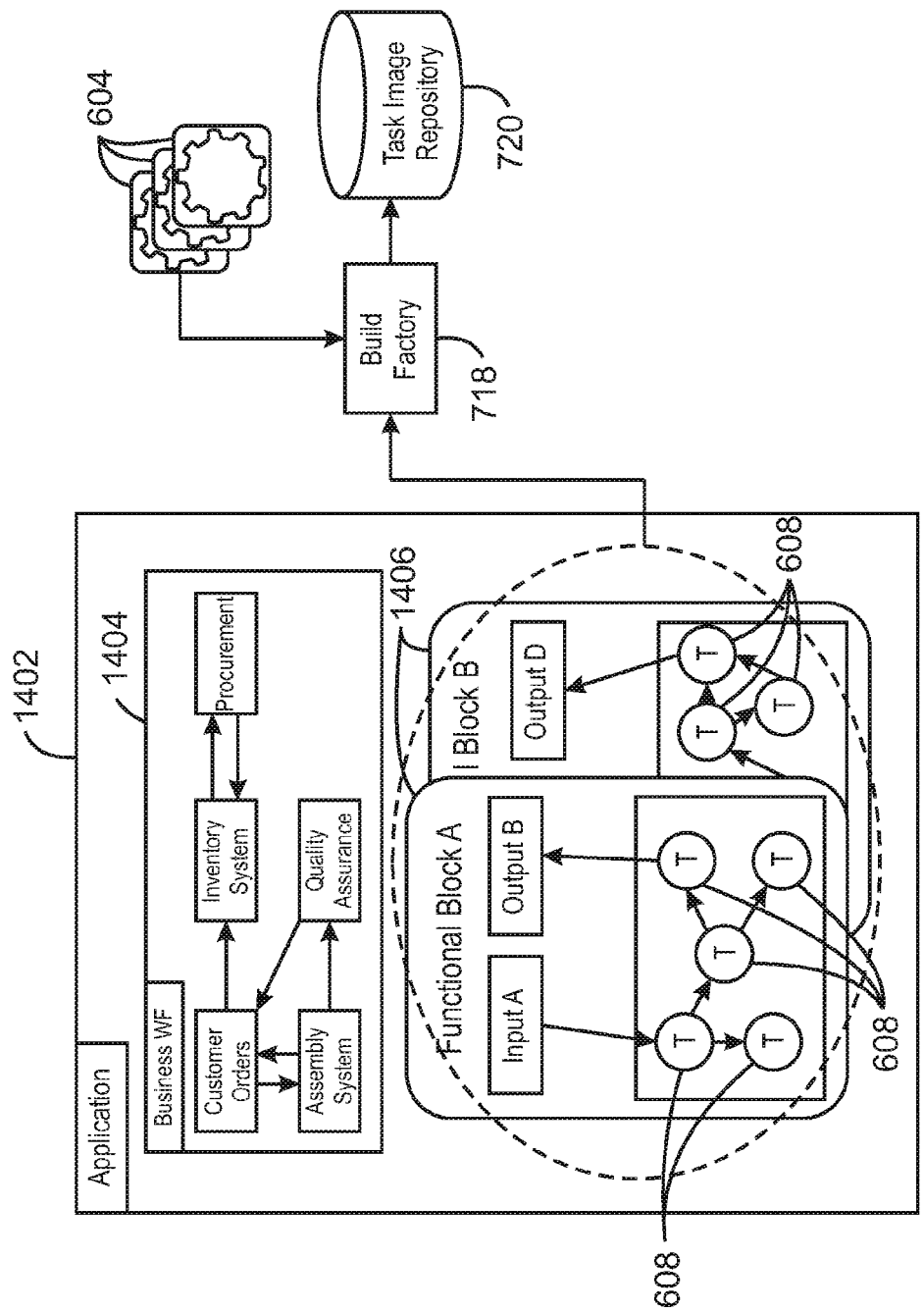
FIG. 14 is a schematic diagram of an example of the application build process in accordance with some embodiments.

FIG. 14 is a schematic diagram of an example of the application build process 1400 in accordance with some embodiments. This example reprises the automobile plant referred to in FIGS. 3, 4, 7, 11, and 12. Like numbered items are as described with respect to FIGS. 6 and 7. To deploy an application 1402, the business team defines business requirements, e.g., as a business workflow 1404, which may determine which functional blocks 1406 are required and how they should be interconnected. The development and operations team builds the functional blocks 1406 and maintains the infrastructure.

Business, latency, and availability requirements may dictate the set of task images pre-built for deployment. Before the application 1402 can be deployed, the individual tasks 608 that make up the functional blocks 1406 must be readied for deployment. The functional blocks 1406 or tasks 608 used for the application 1402 may be enclosed in deployable containers 604, either ahead of time or at run time, for example, in the build factory 718, forming containerized tasks 610. Each functional block 1406 may include multiple containerized tasks 610.

In some cases, a single piece of source code may be complied to run on different platforms, for example, using different instruction sets, or using container environments that are indifferent to physical environments, e.g., a task running under Linux in a virtual machine, versus a Linux Docker environment. In other cases, different source implementations may be required for different environments, e.g., a CPU versus a GPU implementation of an algorithm, a firmware implementation vs Linux Docker container implementation, or a Windows VM implementation, among others.

The build factory 718 may be used to build multiple versions of each task 608 required in a functional block 1406 that is in turn required in an application. For example, each task 608 may be built (containerized) for all compatible target platforms and containers, or the task 608 may be built for the most likely subset. Each build may be combined with a container template 604, e.g., a docker base image or a base virtual machine image, and packaged for deployment.

The resulting task images, or containerized tasks 610, may be stored in the task image repository 720. A task image may include the full runtime stack for the task, such as a virtual machine container image, or a full system image such as firmware, among others. At deployment time, and dynamically during run time, an orchestration device 712 maps containerized tasks 610 required by the defined application 1402 to resources available in the device/capability map 710, generating a task deployment map 722. The task deployment map 722 is fed to each node's controller 714, which may deploy the tasks 1408 from the task image repository 720. In some embodiments, the controller 714 may query the task deployment map 722, and deploy assigned the tasks 1408 from the task image repository 720.

Figure 15:
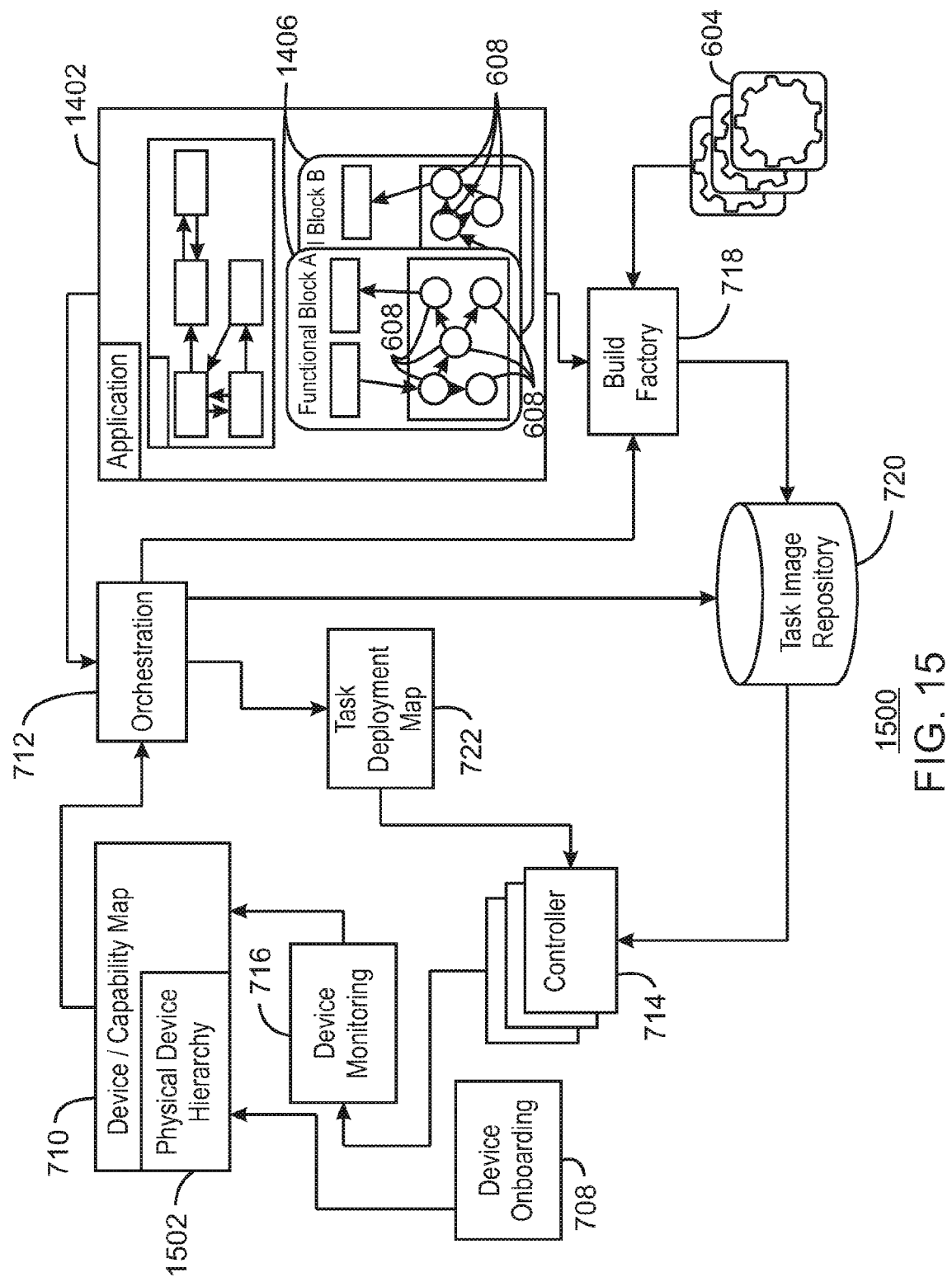
FIG. 15 is a schematic diagram of an example of an orchestration process in accordance with some embodiments.

FIG. 15 is a schematic diagram of an example of an orchestration process 1500 in accordance with some embodiments. During deployment, the modules defined in this application are thus deployed in clusters, each managing a coherent set of physical devices.

Like numbered items are as described with respect to FIGS. 6, 7, and 14. When new IoT devices are introduced to the IoT system, a device onboarding tool 708 identifies the IoT devices and their capabilities, and provides that information to the device/capability map 710. A physical device hierarchy 1502 may be generated, for example, as shown in the JSON code above.

At runtime, the orchestration device 712 is used to deploy the application 1402. Each device in the constellation of on boarded devices may include a controller 714, which reports the current device state and metrics, such as CPU utilization, networking, and the like, to the monitoring/telemetry tool 716 for inclusion in the device/capability map 710.

The device capabilities, including a device map and metrics, are provided from the device/capability map 710 to the orchestration device 712. The orchestration device 712 also obtains the application structure and quality of service requirements for the application 1402. When deployment of the application 1402 is requested, the orchestration device 712 uses the application definition, including resource requirements, and the device/capability map 710 to produce a task deployment map 722. The task deployment map 722 includes a mapping of containerized tasks 610 to individual nodes, as well as specifying the interconnections between those tasks. The controller 714 on each node may request an appropriate task image from the task image repository 720. If the task image is not available, for example, it has not been built yet, a task image, or containerized task 610, may be built in real time by the build factory 718. Once the task image is deployed and started, the controller 714 connects the inputs and outputs of the local containerized tasks 610 to other containerized tasks 610 according to the task deployment map 722, and the application 1402 starts.

Figure 16:
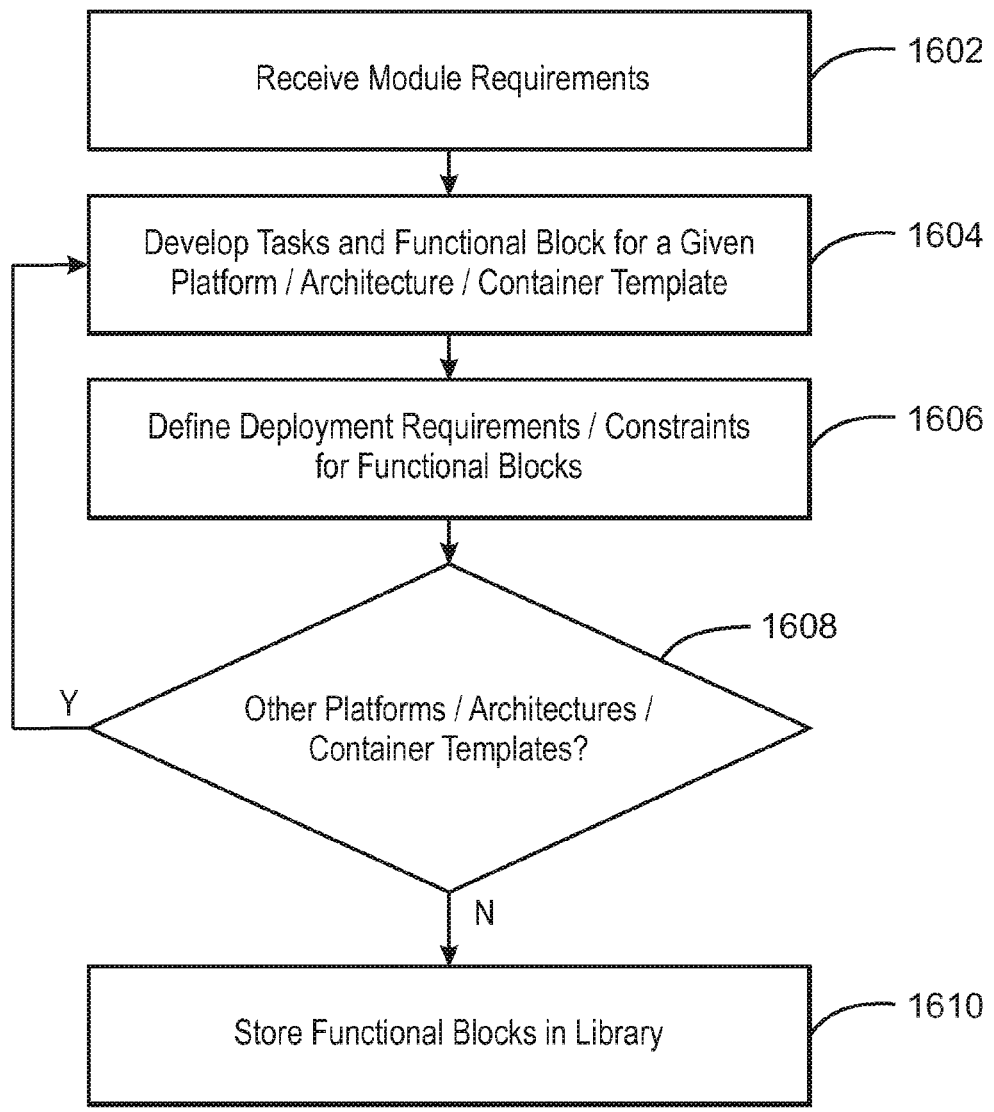
FIG. 16 is a block diagram of an example of a method for defining functional blocks in accordance with some embodiments.

FIG. 16 is a block diagram of an example of a method 1600 for defining functional blocks in accordance with some embodiments. The method 1600 may begin at block 1602 with the receipt of module requirements for one or more applications that may be run on an IoT system.

At block 1604, a development and operations team may develop tasks and functional blocks for a given platform, architecture, or container template. At block 1606, the deployment requirements and constraints for functional blocks may be defined. At block 1608, other platforms, architecture, or container templates that may be used for the applications may be identified. If at block 1608, other platforms, architectures, or container templates have been identified, process flow may return to block 1604 to repeat the development for the newly identified platforms, architectures, or container templates. Once development has been completed, at block 1610 the functional blocks may be stored in a library, such as a task repository.

Figure 17:
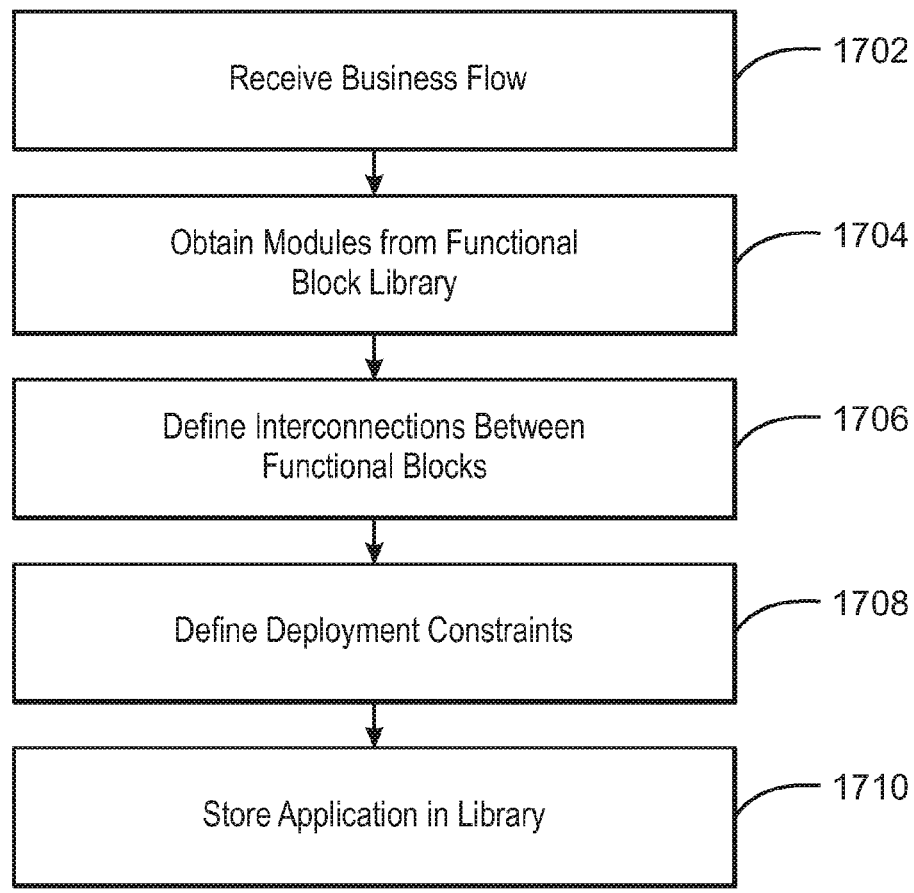
FIG. 17 is a block diagram of an example of a method for defining applications in accordance with some embodiments.

FIG. 17 is a block diagram of an example of a method 1700 for defining applications in accordance with some embodiments. The method 1700 may be run described with respect to FIG. 19, in an administrative computer for a developmental and operations team, or automatically on a server. The method 1700 may begin at block 1702 when a business flow is received and acted on by a development and operations team, an automated application generation system, or combination thereof. The business flow may be a workflow as defined herein. At block 1704, modules and tasks are obtained from a functional block library. In some examples, the modules and tasks may be obtained from a micro service provider located in the cloud. At block 1706, interconnections between the functional blocks, and tasks, are defined. At block 1708, the deployment constraints for deploying the application, including the tasks and functional blocks, are defined. At block 1710, the application is stored in library.

Figure 18:
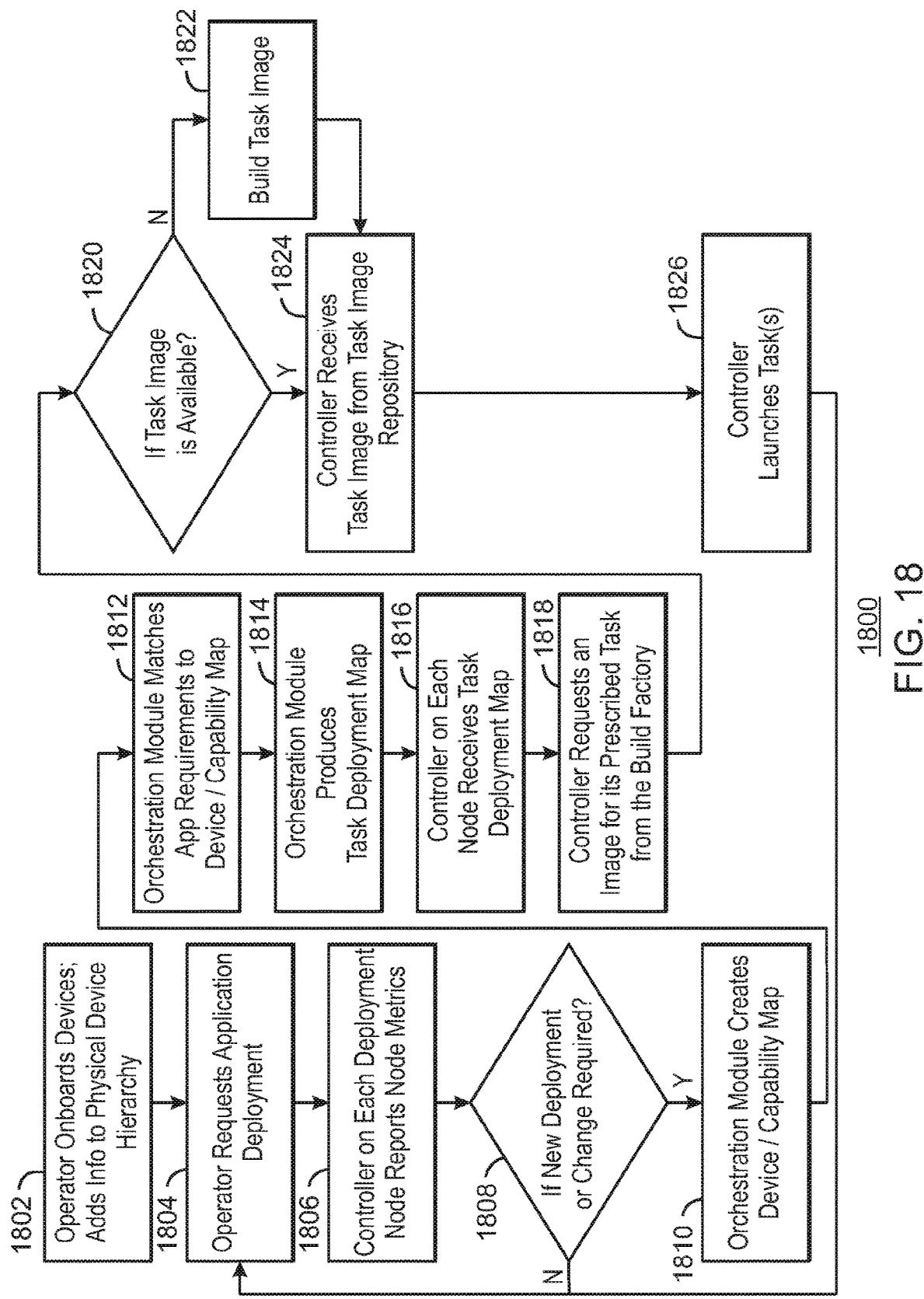
FIG. 18 is a block diagram of an example of a method for orchestrating the deployment of applications in accordance with some embodiments.

FIG. 18 is a block diagram of an example of a method 1800 for orchestrating the deployment of applications in accordance with some embodiments. The method may begin at block 1802, when an operator on boards a device. An onboarding tool may add information about the device to a physical device hierarchy.

At block 1804, an operator may request application deployment. This may be performed by sending the application workflow to an automated tool, or by specifically identifying the parts of the application to be sent to the IoT network, or by combination thereof.

At block 1806, a controller on each deployment node reports node metrics for that node. The node metrics may include CPU usage, memory usage, reserve power, network usage, current applications, and the like. At block 1808, a determination is made if a new deployment, or a change to and existing deployment is needed. If not, process flow returns to block 1804.

At block 1810, an orchestration module creates a device/capability map as described herein. At block 1812, the orchestration module matches application requirements to the device/capability map. Using this information, at block 1814, the orchestration module produces a task deployment map.

At block 1816, the controller on each node receives the task deployment map. This may be performed by pushing the task deployment map to each of the controllers, or by having each controller access the task deployment map to determine what tasks it should perform. At block 1818, each controller requests a task image for its prescribed tasks from a build factory.

At block 1820, a determination is made as to whether a task image is available. If not, at block 1822, a task image is built from the task definition and a container appropriate to the implementation. At block 1824, each controller receives task images from the task image repository. At block 1826, each controller launches the tasks used to implement the application.

Figure 19:
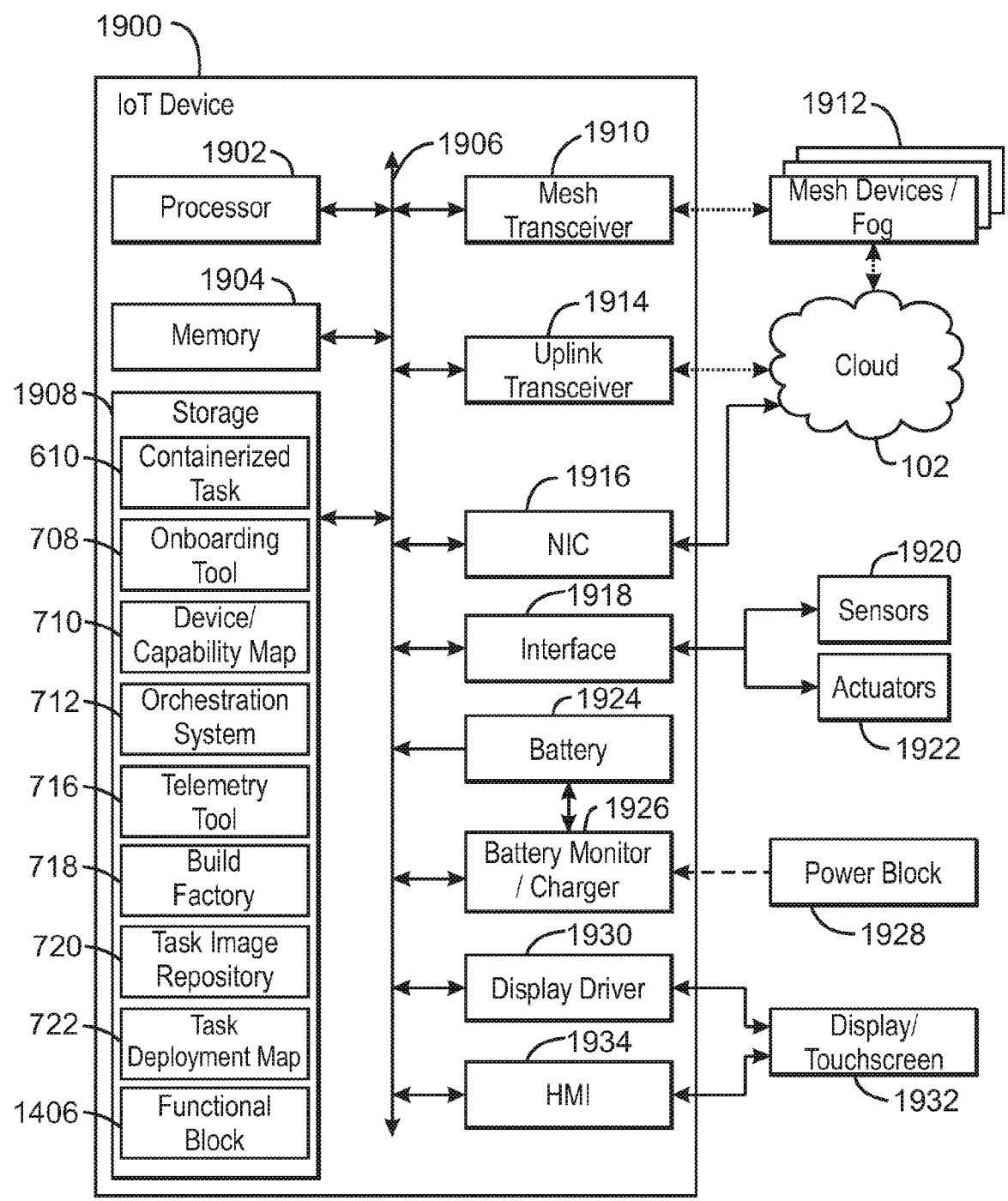
FIG. 19 is a block diagram of an example of components that may be present in an IoT device for the adaptive deployment of applications in accordance with some embodiments.

FIG. 19 is a block diagram of an example of components that may be present in an IoT device 1900 for the adaptive deployment of applications in accordance with some embodiments. Like numbered items are as described with respect to FIGS. 6, 7, and 14. The IoT device 1900 may include any combinations of the components shown in the example. The components may be implemented as ICs, portions thereof, discrete electronic devices, or other modules, logic, hardware, software, firmware, or a combination thereof adapted in the IoT device 1900, or as components otherwise incorporated within a chassis of a larger system. The block diagram of FIG. 19 is intended to show a high level view of components of the IoT device 1900. However, some of the components shown may be omitted, additional components may be present, and different arrangement of the components shown may occur in other implementations.

Further, the IoT device 1900 may not include all of the blocks used to orchestrate an application. For example, the IoT device 1900 may include only the containerized task 610, functional block 1406, or both, used to implement an application or a portion of an application. In other examples, the IoT device 1900 may include all of the tools used to build, deploy, and orchestrate tasks for applications.

The IoT device 1900 may include a processor 1902, which may be a microprocessor, a multi-core processor, a multithreaded processor, an ultra-low voltage processor, an embedded processor, or other known processing element. The processor 1902 may be a part of a system on a chip (SoC) in which the processor 1902 and other components are formed into a single integrated circuit, or a single package, such as the Edison™ or Galileo™ SoC boards from Intel. As an example, the processor 1902 may include an Intel® Architecture Core™ based processor, such as a Quark™, an Atom™, an i3, an i5, an i7, or an MCU-class processor, or another such processor available from Intel® Corporation, Santa Clara, CA However, any number other processors may be used, such as available from Advanced Micro Devices, Inc. (AMD) of Sunnyvale, CA, a MIPS-based design from MIPS Technologies, Inc. of Sunnyvale, CA, an ARM-based design licensed from ARM Holdings, Ltd. or customer thereof, or their licensees or adopters. The processors may include units such as an A5-A9 processor from Apple® Inc., a Snapdragon™ processor from Qualcomm® Technologies, Inc., or an OMAP™ processor from Texas Instruments, Inc. The processor 3002 may include a graphics processing unit (GPU) or a floating-point gate array (FPGA) in addition to, or instead of, the processors described herein.

The processor 1902 may communicate with a system memory 1904 over a bus 1906. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 1908 may also be coupled to the processor 1902 via the bus 1906. To enable a thinner and lighter system design, the mass storage 1908 may be implemented via a solid state drive (SSD). Other devices that may be used for the mass storage 1908 include flash memory cards, such as SD cards, microSD cards, xD picture cards, and the like, and USB flash drives.

In low power implementations, the mass storage 1908 may be on-die memory or registers associated with the processor 1902. However, in some examples, the mass storage 1908 may be implemented using a micro hard disk drive (HDD). Further, any number of new technologies may be used for the mass storage 1908 in addition to, or instead of, the technologies described, such resistance change memories, phase change memories, holographic memories, or chemical memories, among others. For example, the IoT device 1900 may incorporate the 3D XPOINT memories from Intel® and Micron®.

The components may communicate over the bus 1906. The bus 1906 may include any number of technologies, including industry standard architecture (ISA), extended ISA (EISA), peripheral component interconnect (PCI), peripheral component interconnect extended (PCIx), PCI express (PCIe), or any number of other technologies. The bus 1906 may be a proprietary bus, for example, used in a SoC based system. Other bus systems may be included, such as an I$^2$C interface, I$^3$C interface, an SPI interface, point to point interfaces, and a power bus, among others.

The bus 1906 may couple the processor 1902 to a mesh transceiver 1910, for communications with other mesh devices 1912. The mesh transceiver 1910 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1912. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via a WWAN unit.

The mesh transceiver 1910 may communicate using multiple standards or radios for communications at different range. For example, the IoT device 1900 may communicate with geographically proximate devices, e.g., within about 10 meters, using a local transceiver based on BLE, or another low power radio, to save power. More distant mesh devices 1912, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee. The mesh transceiver 1910 may be incorporated into an MCU as an address directly accessible by the chip, such as in the Curie® units available from Intel.

An uplink transceiver 1914 may be included to communicate with devices in the cloud 102. The uplink transceiver 1914 may be LPWA transceiver that follows the IEEE 802.15.4, IEEE 802.15.4g, IEEE 802.15.4e, IEEE 802.15.4k, or NB-IoT standards, among others. The IoT device 1900 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1910 and uplink transceiver 1914, as described herein. For example, the radio transceivers 1910 and 1912 may include an LTE or other cellular transceiver that uses spread spectrum (SPA/SAS) communications for implementing high-speed communications, such as for video transfers. Further, any number of other protocols may be used, such as Wi-Fi® networks for medium speed communications, such as still pictures, sensor readings, and provision of network communications.

The radio transceivers 1910 and 1912 may include radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), or Narrow Band IoT (NB-IoT), among others. It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High-speed Packet Access), HSDPA (High-Speed Downlink Packet Access), HSUPA (High-Speed Uplink Packet Access), HSPA+ (High-speed Packet Access Plus), UMTS-TDD (Universal Mobile Telecommunications System—Time-Division Duplex), TD-CDMA (Time Division—Code Division Multiple Access), TD-SCDMA (Time Division—Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PH (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver 1914, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1916 may be included to provide a wired communication to the cloud 102 or to other devices, such as the mesh devices 1912. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1916 may be included to allow connect to a second network, for example, a NIC 1916 providing communications to the cloud over Ethernet, and a second NIC 1916 providing communications to other devices over another type of network.

The bus 1906 may couple the processor 1902 to an interface 1918 that is used to connect external devices. The external devices may include sensors 1920, such as accelerometers, level sensors, flow sensors, temperature sensors, pressure sensors, barometric pressure sensors, and the like. The interface 1918 may be used to connect the IoT device 1900 to actuators 1922, such as power switches, valve actuators, an audible sound generator, a visual warning device, and the like.

A battery 1924 may power the IoT device 1900, although in examples in which the IoT device 1900 is mounted in a fixed location, it may have a power supply coupled to an electrical grid. The battery 1924 may be a lithium ion battery, a metal-air battery, such as a zinc-air battery, an aluminum-air battery, a lithium-air battery, a hybrid supercapacitor, and the like.

A battery monitor/charger 1926 may be included in the IoT device 1900 to track the state of charge (SoCh) of the battery 1920. The battery monitor/charger 1926 may be used to monitor other parameters of the battery 1924 to provide failure predictions, such as the state of health (SoH) and the state of function (SoF) of the battery 1924. The battery monitor/charger 1926 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1926 may communicate the information on the battery 1924 to the processor 1902 over the bus 1906. The battery monitor/charger 1926 may also include an analog-to-digital (ADC) convertor that allows the processor 1902 to directly monitor the voltage of the battery 1926 or the current flow from the battery 1924. The battery parameters may be used to determine actions that the IoT device 1900 may perform, such as transmission frequency, mesh network operation, sensing frequency, and the like.

A power block 1928, or other power supply coupled to a grid, may be coupled with the battery monitor/charger 1926 to charge the battery 1924. In some examples, the power block 1928 may be replaced with a wireless power receiver to obtain the power wirelessly, for example, through a loop antenna in the IoT device 1900. A wireless battery charging circuit, such as an LTC4020 chip from Linear Technologies of Milpitas, CA, among others, may be included in the battery monitor/charger 1926. The specific charging circuits chosen depend on the size of the battery 1924, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others. In some examples, the power block 1928 may be augmented or replaced with solar panels, a wind generator, a water generator, or other natural power systems.

Various input/output (I/O) devices may be present within, or connected to, the IoT device 1900. The display may be included to show information, such as sensor readings or actuator positions, among others. The input devices may allow the entry of setpoints, configuration information, and other information that be useful for the deployment. Further, data may be displayed on devices or systems that are not part of the systems network or the trusted network. Data of any kind may be displayed on the IoT display, management displays attached to the IoT system, or other displays after appropriate credentials are entered. These may include, for example, user data, system operator data, intermediate data, stored data, and the like. A display the data to support deployment or user interaction to verify or confirm data entry may be provided.

For example, a display driver 1930 may be coupled to the processor 1902 through the bus 1906. The display driver 1930 may power a display, for example, as part of a display/touchscreen 1932. A human machine interface 1934 may interface with the touchscreen portion of the display/touchscreen 1932 to obtain input. Any number of other display devices may be used including monitors, flat screen displays, LEDs, CRTs, and the like. Similarly, any number of other input devices may be used including keyboards, mice, trackballs, and the like.

The mass storage 1908 may include a number of modules to implement the group creation functions described herein. Although shown as code blocks in the mass storage 1908, it may be understood that any of the modules may be fully or partially replaced with hardwired circuits, for example, built into an application specific integrated circuit (ASIC). The mass storage 1908 may include an on-boarding tool 708, as described herein. A monitoring/telemetry tool 716 may be used in mesh devices or fog devices 1912 to provide monitoring information, such as operational metrics. A device/capability map 710 may be used to track devices and their capabilities, for example, based on the metrics provided by the monitoring/telemetry tool 716. An orchestration device 712 may be included to determine what nodes applications, functional blocks, and tasks should be mapped to, for example, based on the capabilities saved in the device/capability map 710. The orchestration device 712 may generate a task deployment map 722 identifying which nodes are assigned what applications, functional blocks, and tasks. The orchestration device 712 may shift the location of tasks in the task deployment map 722 depending on the metrics reported in the device/capability map 710.

A build factory 718 may be included to package tasks in containers and save those task to task image repository 720. Individual nodes in the mesh 1912 may request task images for particular portions of the application that are assigned to those nodes.

One or more containerized tasks 610 may be included to perform a function for an application or functional block. A functional block 1406 including one or more containerized tasks 610, other functional blocks 1406, or both may be included.

Figure 20:
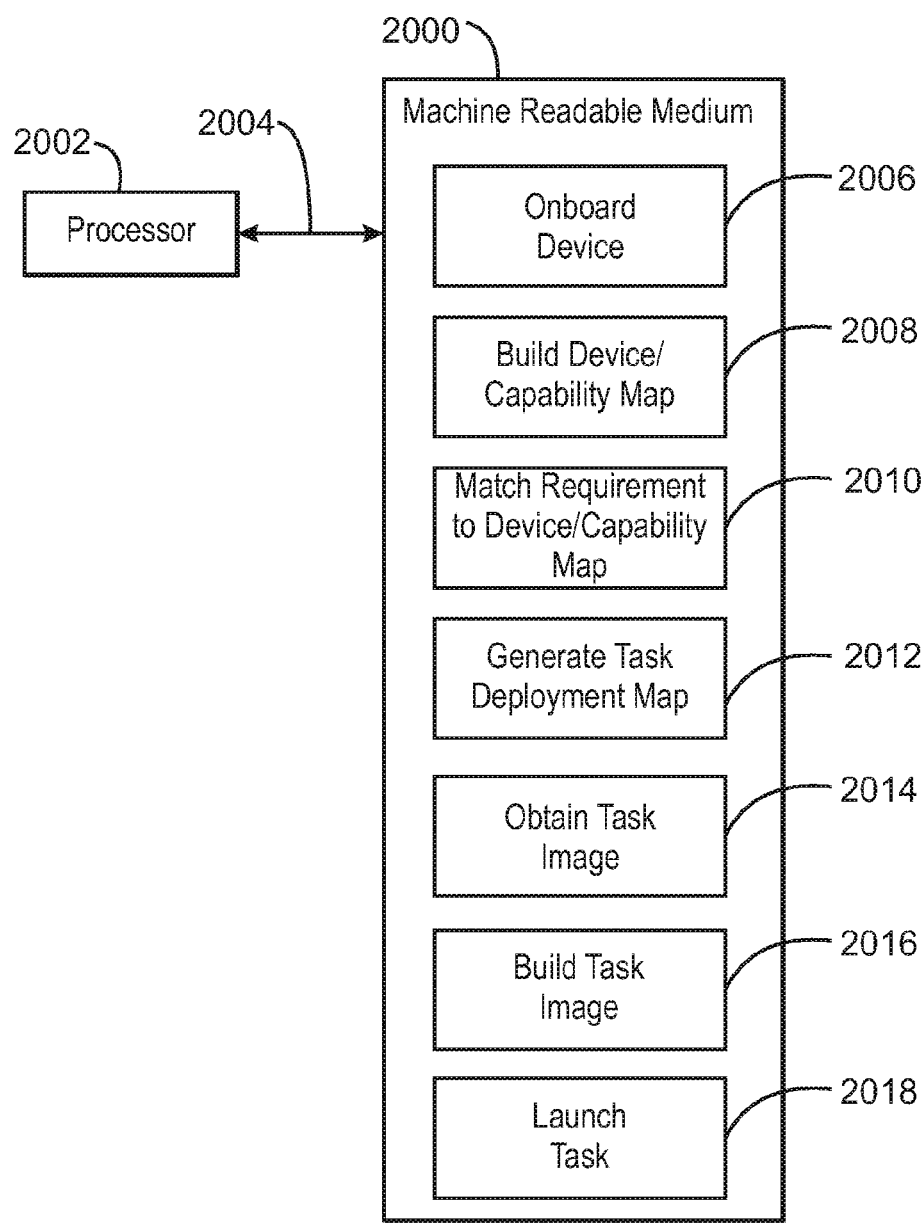
FIG. 20 is a block diagram of an exemplary non-transitory, machine readable medium including code to direct a processor to adaptively deploy applications in accordance with some embodiments.

FIG. 20 is a block diagram of an exemplary non-transitory, machine readable medium 2000 including code to direct a processor 2002 to adaptively deploy applications in accordance with some embodiments. The processor 2002 may access the non-transitory, machine readable medium 2000 over a bus 2004. The processor 2002 and bus 2004 may be selected as described with respect to the processor 1902 and bus 1906 of FIG. 19. The non-transitory, machine readable medium 2000 may include devices described for the mass storage 1908 of FIG. 19 or may include optical disks, thumb drives, or any number of other hardware devices.

As described herein, the non-transitory, machine readable medium 2000 may include code 2006 to direct the processor 2002 to onboard devices coupled to an IoT network. Code 2008 may be included to direct the processor 2002 to build a device/capability map listing devices coupled to the IoT network. Code 2010 may be included to direct the processor 2002 to match requirements for tasks in an application to nodes in the device/capability map.

The machine readable medium 2000 may include code 2012 to direct the processor 2002 to generate a task deployment map. Code 2014 may be included to direct the processor 2002 to obtain task images from a task image repository. Code 2016 may be included to direct the processor 2002 to build task images, for example, packaging tasks in containers for particular nodes, if those task images are not present in the task image repository. Code 2018 may be included to direct the processor 2002 to launch tasks and start an application.

EXAMPLES

Example 1 includes an Internet of Things (IoT) system, including an orchestration device, to receive resource requirements and access a device/capability map to produce a task deployment map.

Example 2 includes the subject matter of example 1. In this example, the IoT system includes the device/capability map including identities, properties, and utilization of an IoT device.

Example 3 includes the subject matter of either of examples 1 or 2. In this example, the IoT system includes a monitoring/telemetry tool to obtain current device state and metrics from an IoT device.

Example 4 includes the subject matter of any of examples 1 to 3. In this example, a monitoring/telemetry tool to provide the current device state and metrics for the IoT device to the device/capability map.

Example 5 includes the subject matter of any of examples 1 to 4. In this example, the IoT system includes a task image repository including containerized tasks.

Example 6 includes the subject matter of any of examples 1 to 5. In this example, the IoT system includes a build factory to package tasks in containers for different operating environments.

Example 7 includes the subject matter of any of examples 1 to 6. In this example, the IoT system includes a device onboarding tool to identify an IoT device and its capabilities, and to provide that information to the device/capability map.

Example 8 includes the subject matter of any of examples 1 to 7. In this example, the IoT system includes an IoT device, including a containerized task to implement a portion of an application.

Example 9 includes the subject matter of any of examples 1 to 8. In this example, the IoT system includes an IoT device, including a functional block.

Example 10 includes the subject matter of any of examples 1 to 9. In this example, the functional block includes a containerized task.

Example 11 includes a method for orchestrating the deployment of applications in an Internet of Things (IoT) system, including creating a device/capability map of a plurality of onboarded devices in the IoT system. The application requirements are matched to the device capability map. A task deployment map is produced. The task deployment map is communicated to a controller in each of the plurality of onboarded devices in the IoT system.

Example 12 includes the subject matter of example 11. In this example, the method includes receiving a request from a controller for a task image. The task images sent from a task image repository to the controller if the task image is available.

Example 13 includes the subject matter of any of examples 11 to 12. In this example, the method includes receiving a request from a controller for a task image. The task image is built at the task image is not present in a task image repository, and the task images saved to the task image repository. The task images sent from the task image repository to the controller.

Example 14 includes the subject matter of any of examples 11 to 13. In this example, the method includes receiving node metrics from each of the plurality of onboarded devices in the IoT system, wherein the node metrics include CPU utilization, network utilization, or memory utilization, or any combinations thereof. The node metrics are saved to the device/capability map.

Example 15 includes the subject matter of any of examples 11 to 14 in this example, the method includes building a task image, including packaging a task in a container, wherein the container is a code segment designed to allow the task to function in a target environment.

Example 16 includes the subject matter of any of examples 11 to 15. In this example, the method includes building a task image, including compiling a task to run as a code segment in a target environment. Example 17 includes the subject matter of any of examples 11 to 16. In this example, the method includes linking the inputs, outputs, or both, of a local containerized task to another containerized task based, at least in part, on the task deployment map.

Example 18 includes the subject matter of any of examples 11 to 17. In this example, the method includes launching a plurality of tasks to start an application.

Example 19 includes the subject matter of any of examples 11 to 18. In this example, the method includes moving a containerized task from a first IoT device to a second IoT device based, at least in part, on metrics reported by the first IoT device.

Example 20 includes a non-transitory, machine readable medium including code that, when executed, directs a processor to create a device/capability map of a plurality of onboarded devices. Code is included to direct the processor to match application requirements to the device/capability map. Code is included to produce a task deployment map, and communicate the task deployment map to controller each of the plurality of onboarded devices.

Example 21 includes the subject matter of example 20. In this example, the non-transitory, machine readable medium includes code that, when executed, directs a processor to receive a request from a controller for a task image, and send the task image from a task image repository to the controller if the task image is available.

Example 22 includes the subject matter of either of examples 20 or 21. In this example, the non-transitory, machine readable medium includes code that, when executed, directs a processor to receive a request from a controller for a task image. If the task image is not present in a task image repository, the code directs the processor to build the task image. The task images saved to the task image repository, and sent from the task image repository to the controller.

Example 23 includes the subject matter of any of examples 20 to 22. In this example, the non-transitory, machine readable medium includes code that, when executed, directs a processor to build a task image, including packaging a task in a container, wherein the container is a code segment designed to allow the task to function in a target environment.

Example 24 includes the subject matter of any of examples 20 to 23. In this example, the non-transitory, machine readable medium includes code that, when executed, directs a processor to launch a task.

Example 25 includes the subject matter of any of examples 20 to 24. In this example, the non-transitory, machine readable medium includes code that, when executed, directs a processor to move a containerized task from a first IoT device to a second IoT device based, at least in part, on metrics reported by the first IoT device.

Example 26 includes a non-transitory, machine-readable medium including instructions to direct a processor in a node to perform any one of the methods of claims 11 to 19.

Example 27 includes an apparatus, that includes means to perform any one of the methods of claims 11 to 19.

Example 28 includes an Internet of Things (IoT) system, including an orchestration device that includes means to receive resource requirements and access a device/capability map to produce a task deployment map.

Example 29 includes the subject matter of example 28. In this example, the IoT system includes a monitoring/telemetry tool that includes means to obtain current device state and metrics from an IoT device.

Example 30 includes the subject matter of either of example 28 or 29. In this example, the monitoring/telemetry tool includes means to provide the current device state and metrics for the IoT device to the device/capability map.

Example 31 includes the subject matter of any of examples 28 to 30. In this example, the IoT system includes a build factory that includes means to package tasks in containers for different operating environments.

Example 32 includes the subject matter of any of examples 28 to 31. In this example, the IoT system includes a device onboarding tool that includes means to identify an IoT device and its capabilities, and to provide that information to the device/capability map. Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. An orchestration device to orchestrate an Internet of Things (IoT) network, comprising:
   a processor;
   a memory device including instructions, which when executed by the processor, cause the processor to:

receive resource requirements for an application to execute on a first plurality of devices in the IoT network;

access a capability graph of a second plurality of devices in the IoT network;

identify a container deployment plan, based on the capability graph, that satisfies the resource requirements; and communicate with one of the second plurality of devices in the IoT network to deploy containers based on the container deployment plan.

2. The orchestration device of claim 1, wherein the capability graph comprises attributes and capabilities of a device of the second plurality of devices.

3. The orchestration device of claim 1, wherein the instructions cause the processor to obtain current device state and metrics from a device.

4. The orchestration device of claim 3, wherein the instructions cause the processor to provide the current device state and metrics for the device to the capability graph.

5. The orchestration device of claim 1, comprising a container repository comprising containerized tasks.

6. The orchestration device of claim 1, comprising instructions, which cause the processor to identify a device and its capabilities, during onboarding, and incorporate the device and its capabilities into the capability graph.

7. The orchestration device of claim 1, wherein a device of the first plurality of devices includes a containerized task to implement a portion of the application.

8. A method for orchestrating an Internet of Things (IoT) network, comprising:

receiving, at an orchestration device, resource requirements for an application to execute on a first plurality of devices in the IoT network;

accessing a capability graph of a second plurality of devices in the IoT network;

identifying a container deployment plan, based on the capability graph, that satisfies the resource requirements; and communicating with one of the second plurality of devices in the IoT network to deploy containers based on the container deployment plan.

9. The method of claim 8, wherein the capability graph comprises attributes and capabilities of a device of the second plurality of devices.

10. The method of claim 8, comprising obtaining current device state and metrics from a device.

11. The method of claim 10, comprising providing the current device state and metrics for the device to the capability graph.

12. The method of claim 8, wherein the orchestration device comprises a container repository comprising containerized tasks.

13. The method of claim 8, comprising identifying a device and its capabilities, during onboarding, and incorporating the device and its capabilities into the capability graph.

14. The method of claim 8, wherein a device of the first plurality of devices includes a containerized task to implement a portion of the application.

15. At least one non-transitory machine-readable medium including instructions for orchestrating a mesh an Internet of Things (IoT) network, which when executed by an orchestrator device, cause the orchestrator device to:

receive resource requirements for an application to execute on a first plurality of devices in the IoT network;

access a capability map of a second plurality of devices in the IoT network;

identify a container deployment plan, based on the capability map, that satisfies the resource requirements; and communicate with one of the second plurality of devices in the IoT network to coordinate deployment of containers based on the container deployment plan.

16. The non-transitory machine-readable medium of claim 15, wherein the capability map comprises attributes and capabilities of a device of the second plurality of devices.

17. The non-transitory machine-readable medium of claim 15, wherein the instructions cause the orchestrator device to access current device state and metrics from a device.

18. The non-transitory machine-readable medium of claim 17, wherein the instructions cause the orchestrator device to provide the current device state and metrics for the device to the capability map.

19. The non-transitory machine-readable medium of claim 15, wherein the orchestration device comprises a container repository comprising containerized tasks.

20. The non-transitory machine-readable medium of claim 15, comprising instructions, which cause the orchestrator device to identify a device and its capabilities, during onboarding, and incorporate the device and its capabilities into the capability map.

21. The non-transitory machine-readable medium of claim 15, wherein a device of the first plurality of devices includes a containerized task to implement a portion of the application.

\* \* \* \* \*

UNITED STATES PATENT AND TRADEMARK OFFICE
CERTIFICATE OF CORRECTION

PATENT NO. : 12,015,499 B2  
APPLICATION NO. : 17/702264  
DATED : June 18, 2024  
INVENTOR(S) : Yarvis et al.

Page 1 of 1

It is certified that error appears in the above-identified patent and that said Letters Patent is hereby corrected as shown below:

In the Claims

In Column 28, Line 12, in Claim 15, after "orchestrating", delete "a mesh"

Signed and Sealed this  
Nineteenth Day of August, 2025

Coke Morgan Stewart  
*Acting Director of the United States Patent and Trademark Office*